United States Patent
Elkotby et al.

(10) Patent No.: US 11,706,713 B2
(45) Date of Patent: Jul. 18, 2023

(54) METHODS FOR UPDATING SYSTEM INFORMATION AND WIRELESS TRANSMIT/RECEIVE UNITS USING THEREOF

(71) Applicant: INTERDIGITAL PATENT HOLDINGS, INC., Wilmington, DE (US)

(72) Inventors: Hussain E. Elkotby, Conshohocken, PA (US); Ravikumar V. Pragada, Warrington, PA (US); Tanbir Haque, Jackson Heights, NY (US); Patrick Cabrol, Bayshore, NY (US); Anantharaman Balasubramanian, San Diego, CA (US); Marian Rudolf, Montreal (CA); William E. Lawton, Pottstown, PA (US)

(73) Assignee: INTEGRATED PATENT HOLDINGS, INC., Wilmington, DE (US)

( * ) Notice: Subject to any disclaimer, the term of this patent is extended or adjusted under 35 U.S.C. 154(b) by 95 days.

(21) Appl. No.: 17/414,210

(22) PCT Filed: Dec. 17, 2019

(86) PCT No.: PCT/US2019/066904
§ 371 (c)(1),
(2) Date: Jun. 15, 2021

(87) PCT Pub. No.: WO2020/131907
PCT Pub. Date: Jun. 25, 2020

(65) Prior Publication Data
US 2022/0070775 A1   Mar. 3, 2022

Related U.S. Application Data

(60) Provisional application No. 62/886,101, filed on Aug. 13, 2019, provisional application No. 62/780,651, filed on Dec. 17, 2018.

(51) Int. Cl.
    *H04W 52/02* (2009.01)
(52) U.S. Cl.
    CPC ............... *H04W 52/0229* (2013.01)
(58) Field of Classification Search
    CPC ............ H04W 52/0229; Y02D 30/70
    See application file for complete search history.

(56) References Cited

U.S. PATENT DOCUMENTS 7,672,258 B1 * 3/2010 Wu .................. H04W 52/0229
                                                      370/311
11,006,265 B2   5/2021 Kim et al.
(Continued)

FOREIGN PATENT DOCUMENTS

WO    2020/236665    11/2020

OTHER PUBLICATIONS

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 9: Wake-Up Radio Operation, IEEE P802.11ba/D1.0 (Sep. 2018).

(Continued)

*Primary Examiner* — Marcos L Torres
(74) *Attorney, Agent, or Firm* — Volpe Koenig

(57) ABSTRACT

A method for use in a Wireless Transmit/Receive Unit (WTRU). The method comprises: receiving, using an active receiver, system information comprising a first system information set, wherein the first system information set is currently valid for the WTRU; storing the system information; deactivating the active receiver and activating a passive receiver; determining whether a difference between a first parameter in the BSSI and a first parameter in the first system information set is greater than a threshold value, (Continued)

wherein on a condition that the difference is greater than the threshold value, reactivating the active receiver to receive a second system information set as a currently valid system information set for the WTRU.

20 Claims, 17 Drawing Sheets

(56) References Cited

U.S. PATENT DOCUMENTS

| | | | |
|---|---|---|---|
| 2014/0112229 A1 | 4/2014 | Merlin et al. | |
| 2017/0311290 A1* | 10/2017 | Adjakple | H04W 76/18 |
| 2019/0349857 A1* | 11/2019 | Kim | H04W 80/02 |
| 2020/0314752 A1* | 10/2020 | Haque | H04W 52/0216 |

OTHER PUBLICATIONS

Ericsson et al., "CR of UE RF requirement on subPRB feature," 3GPP TSG-RAN4 Meeting #87, R4-1808073, Busan, Korea (May 21-25, 2018).
Ericsson, "EARFCN provisioning for UE in enhanced coverage," 3GPP TSG-RAN2 Meeting #102, R2-1808859, Busan, Korea (May 21-25, 2018).
Ericsson, "Introduction of CRS muting requirements for Rel-15 MTC," 3GPP TSG-RN WG4 Meeting #87, R4-1808470, Busan, Republic of Korea (May 21-25, 2018).
Ericsson, "Introduction of enhancements for eMTC excluding EDT," 3GPP TSG-RAN2 Meeting #102, R2-1809253, Busan, Korea (May 21-25, 2018).
Ericsson, "Introduction of Even Further Enhanced MTC for LTE," 3GPP TSG RAN WG1 Meeting #93, R1-1807935, Busan, Korea (May 21-25, 2018).
Ericsson, "Introduction of further NB-IoT enhancements in 36.306," 3GPP TSG-RAN WG2 Meeting #102, R2-1809222, Busan, Korea (May 21-25, 2018).
Ericsson, "Introduction of further NB-IoT enhancements in 36.322," 3GPP TSG-RAN WG2 Meeting #102, R2-1808844, Busan, Korea (May 21-25, 2018).
Ericsson, "Introduction of further NB-IoT enhancements in TS 36.321," 3GPP TSG-RAN WG2 Meeting #102, R2-1809232, Busan, Korea (May 21-25, 2018).
Ericsson, "Introduction of High-velocity support for muting for Rel-15 MTC," 3GPP TSG-RN WG4 Meeting #87, R4-1807600, Busan, Republic of Korea (May 21-25, 2018).
Ericsson, "Introduction of measurement gaps for dense PRS," 3GPP TSG-RAN WG4 Meeting #87, R4-1808461, Busan, Korea (May 21-25, 2018).
Ericsson, "Introduction of NB-IoT TDD support," 3GPP TSG-RAN WG4 Meeting 87, R4-1808165, Busan, Korea (May 21-25, 2018).
Ericsson, "Introduction of NB-IoT TDD support," 3GPP TSG-RAN WG4 Meeting 87, R4-1806734, Busan, Korea (May 21-25, 2018).
Ericsson, "Introduction of NB-IoT TDD support," 3GPP TSG-RAN WG4 Meeting 87, R4-1808547, Busan, Korea (May 21-25, 2018).
Ericsson, "Introduction Rel-15 Further NB-IoT enhancements," 3GPP TSG-RAN1 Meeting #93, R1-1807941, Busan, Korea (May 21-25, 2018).
Ericsson, "Introduction Rel-15 Further NB-IoT enhancements," 3GPP TSG-RAN1 Meeting #93, R1-1807939, Busan, Korea (May 21-25, 2018).
Ericsson, "MPR for PC6 CAT-M1 and CAT-M2," 3GPP TSG-RAN WG4 Meeting #87, R4-1805603, Busan, Korea (May 21-25, 2018).
Ericsson, "RSTD measurement requirements with new gaps," 3GPP TSG-RAN WG4 Meeting #87, R4-1806193, Busan, Korea (May 21-25, 2018).
Ericsson, "Side conditions for supporting TDD NB-IOT," 3GPP TSG-RAN WG4 Meeting #87, R4-1807601, Busan, Korea (May 21-25, 2018).

Huawei et al., "CR for relaxed monitoring of cell reselection," 3GPP TSG-RAN WG4 Meeting #86bis, R4-1805952, Melbourne, Australia (Apr. 16-20, 2018).
Huawei et al., "CR for serving cell measurement relaxation for WUS-capable UR," 3GPP TSG-RAN WG4 Meeting #87, R4-1808451, Busan, Korea (May 21-25, 2018).
Huawei et al., "CR on CGI requirements for CEmodeB," 3GPP TSG-RAN WG4 Meeting #87, R4-1807946, Busan, Korea (May 21-25, 2018).
Huawei et al., "CR on new gap impact on intra-frequency RSTD requirements for cat M2," 3GPP TSG-RAN WG4 Meeting #87, R4-1807979, Busan, Korea (May 21-25, 2018).
Huawei et al., "CR on new gap impact on intra-frequency RSTD requirements for cat M1," 3GPP TSG-RAN WG4 Meeting #87, R4-1807978, Busan, Korea (May 21-25, 2018).
Huawei et al., "Introduction of early data transmission," 3GPP TSG-RAN3 Meeting #100, R3-183469, Busan, Korea (May 21-25, 2018).
Huawei et al., "Introduction of EDT for eMTC and NB-IoT enhancements," 3GPP TSG-RAN2 Meeting #102, R2-1809256, Busan, Korea (May 21-25, 2018).
Huawei et al., "Introduction of further NB-IoT enhancements other than EDT in TS 36.331," 3GPP TSG-RAN2 Meeting #102, R2-1809276, Busan, Korea (May 21-25, 2018).
Huawei et al., "Introduction of further NB-IoT enhancements other than EDT in TS 36.300," 3GPP TSG-RAN WG2 Meeting #102, R2-1809248, Busan, Korea (May 21-25, 2018).
Huawei et al., "Introduction of Rel-15 eMTC enhancements in 36.302," 3GPP TSG-RAN2 Meeting #102, R2-1809225, Busan, Korea (May 21-25, 2018).
Huawei et al., "Introduction of Rel-15 NB-IoT enhancements in 36.302," 3GPP TSG-RAN WG2 Meeting #102, R2-1809224, Busan, Korea (May 21-25, 2018).
Huawei, "Clarification on CRC attachment for DL-SCH and PCH transport channels in NB-IoT," 3GPP TSG RAN WG1 Meeting #92bis, R1-1805327, Sanya, China (Apr. 16-20, 2018).
Huawei, "CR for TDD NB-IoT RRM requirement," 3GPP TSG-RAN WG4 Meeting #87, R4-1807326, Busan, Korea (May 21-25, 2018).
Huawei, "Introduction of EDT for eMTC and NB-IoT enhancements in TS 36.300," 3GPP TSG-RAN2 Meeting #102, R2-1809252, Busan, Korea (May 21-25, 2018).
Huawei, "Introduction of even further enhanced MTC for LTE in 36.212," 3GPP TSG RAN WG1 Meeting #93, R1-1807916, Busan, Korea (May 21-25, 2018).
Huawei, "Introduction of further enhancements to NB-IoT in 36.212," 3GPP TSG-RAN1 Meeting #93, R1-1807917, Busan, Korea (May 21-25, 2018).
Huawei, "Support of NB-IoT measurement enhancement and TDD Config," 3GPP TSG-RAN3 Meeting #100, R3-183575, Busan, Korea (May 21-25, 2018).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Speci-

(56) References Cited

OTHER PUBLICATIONS fications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Intel Corporation, "Introduction of EDT for eMTC and NB-IoT in Rel-15 TS 36.321," 3GPP TSG-RAN WG2 Meeting #102, R2-1809236, Busan, Korea (May 21-25, 2018).
Intel Corporation, "Running Rel-15 36.321 CR for eMTC (excluding EDT)," 3GPP TSG-RAN2 Meeting #102, R2-1809235, Busan, Korea (May 21-25, 2018).
Motorola Mobility, "Introduction of even further enhanced MTC for LTE in 36.213, s08-s09," 3GPP TSG RAN WG1 Meeting #93, R1-1807938, Busan, Korea (May 21-25, 2018).
Motorola Mobility, "Introduction of even further enhanced MTC for LTE in 36.213, s06-s07," 3GPP TSG RAN WG1 Meeting #93, R1-1807937, Busan, Korea (May 21-25, 2018).
Motorola Mobility, "Introduction of even further enhanced MTC for LTE in 36.213, s00-s05," 3GPP TSG RAN WG1 Meeting #93, R1-1807936, Busan, Korea (May 21-25, 2018).
Motorola Mobility, "Introduction of Rel-15 Further NB-IoT enhancements in 36.213, s14," 3GPP TSG-RAN1 Meeting #93, R1-1807940, Busan, Korea (May 21-25, 2018).
Nokia et al., "Introduction of further eMTC enhancements in 36.304," 3GPP TSG-RAN2 Meeting #102, R2-1809254, Busan, Korea (May 21-25, 2018).
Nokia et al., "Introduction of further NB-IoT enhancements in 36.304," 3GPP TSG-RAN WG2 Meeting #102, R2-1809250, Busan, Korea (May 21-25, 2018).
Qualcomm Corporation, "Introduction of even further eMTC enhancmenets for eMTC," 3GPP TSG-RAN2 Meeting #102, R2-1809263, Busan, Korea (May 21-25, 2018).
Qualcomm Incorporated et al., "Introduction of further NB-IoT enhancements in 36.323," 3GPP TSG-RAN WG2 Meeting #102, R2-1809198, Busan, Korea (May 21-25, 2018).
Qualcomm Incorporated, "Addition of NB-IoT TDD support," 3GPP TSG-RAN WG2 Meeting #102, R2-1809251, Busan, Korea (May 21-25, 2018).
Qualcomm Incorporated, "Introduction of Rel-15 eMTC enhancements (other than EDT)," 3GPP TSG-RAN2 Meeting #102, R2-1809257, Busan, Korea (May 21-25, 2018).
Qualcomm Incorporated, "Report of email discussion to progress open issues on WUS," 3GPP TSG RAN WG2 #102, R2-1807097, Busan, Korea (May 21-25, 2018).
R3 (Huawei), "Introduction of EDT for eMTC and NB-IoT enhancements in TS 36.300," 3GPP TSG-RAN WG2 Meeting #102, R2-1809197, Busan, Korea (May 21-25, 2018).
RAN1, "Introduction of even further enhanced MTC for LTE," 3GPP TSG-RAN Meeting #80, RP-181083, La Jolla, CA, United States (Jun. 11-14, 2018).
RAN1, "Introduction Rel-15 Further NB-IoT enhancements," 3GPP TSG-RAN Meeting #80, RP-181166, La Jolla, CA, United States (Jun. 11-14, 2018).
RAN2, "RAN2 CRs to Even further enhanced MTC for LTE," 3GPP TSG-RAN Meeting #80, RP-181224, La Jolla, CA, United States (Jun. 11-14, 2018).
RAN2, "RAN2 CRs to Further NB-IoT enhancements," 3GPP TSG-RAN Meeting #80, RP-181252, La Jolla, CA, United States (Jun. 11-14, 2018).
RAN3, "CRs for Further NB-IoT enhancements and Even further enhanced MTC for LTE," 3GPP TSG-RAN Meeting #80, RP-181242, La Jolla, CA, United States (Jun. 11-14, 2018).
RAN4, "RAN4 CRs to Even further enhanced MTC for LTE," 3GPP TSG-RAN Meeting #80, RP-181083, La Jolla, CA, United States (Jun. 11-14, 2018).
RAN4, "RAN4 CRs to Further NB-IoT enhancements," 3GPP TSG-RAN Meeting #80, RP-181084, La Jolla, CA, United States (Jun. 11-14, 2018).
Third Generation Partnership Project, "Technical Specification Group Radio Access Network; Evolved Universal Terrestrial Radio Access (E-UTRA); User Equipment (UE) procedures in idle mode (Release 15)," 3GPP TS 36.304 V15.1.0 (Sep. 2018).
Third Generation Partnership Project, "Technical Specification Group Radio Access Network; Evolved Universal Terrestrial Radio Access (E-UTRA); User Equipment (UE) procedures in idle mode (Release 15)," 3GPP TS 36.304 V15.4.0 (Jun. 2019).
Third Generation Partnership Project, "Technical Specification Group Radio Access Network; NR; User Equipment (UE) procedures in Idle mode and RRC Inactive state (Release 15)," 3GPP TS 38.304 V15.1.0 (Sep. 2018).
Third Generation Partnership Project, "Technical Specification Group Radio Access Network; NR; User Equipment (UE) procedures in Idle mode and RRC Inactive state (Release 15)," 3GPP TS 38.304 V15.5.0 (Sep. 2018).
Third Generation Partnership Project, "Technical Specification Group Core Network and Terminals; Non-Access-Stratum (NAS) functions related to Mobile Station (MS) in idle mode (Release 15)," 3GPP TS 23.122 V15.5.0 (Sep. 2018).
Third Generation Partnership Project, "Technical Specification Group Core Network and Terminals; Non-Access-Stratum (NAS) functions related to Mobile Station (MS) in idle mode (Release 15)," 3GPP TS 23.122 V15.7.0 (Mar. 2019).
Third Generation Partnership Project, "Technical Specification Group Core Network and Terminals; Non-Access-Stratum (NAS) functions related to Mobile Station (MS) in idle mode (Release 16)," 3GPP TS 23.122 V16.3.0 (Sep. 2019).
ZTE Corporation, "Correction on delta-RxLevMinCE1," 3GPP TSG-RAN2 Meeting #102, R2-1809091, Busan, Korea (May 21-25, 2018).
ZTE Corporation, "Correction on delta-RxLevMinCE1," 3GPP TSG-RAN2 Meeting #102, R2-1808868, Busan, Korea (May 21-25, 2018).

* cited by examiner

METHODS FOR UPDATING SYSTEM
INFORMATION AND WIRELESS
TRANSMIT/RECEIVE UNITS USING
THEREOF

CROSS-REFERENCE TO RELATED APPLICATIONS

This application is the U.S. National Stage, under 35 U.S.C. § 371, of International Application No. PCT/US2019/066904, filed Dec. 17, 2019, which claims the benefit of U.S. Provisional Application No. 62/780,651, filed Dec. 17, 2018 and U.S. Provisional Application No. 62/886,101 filed Aug. 13, 2019, the contents of which are incorporated herein by reference.

BACKGROUND

A passive receiver or zero-energy (ZE) receiver is a type of radio frequency (RF) circuitry that can process received RF waveforms in absence of an active power supply. For example, such a device may harvest energy from the received RF waveform to run the necessary circuitry to process received signals. This passive receiver may use RF components such as cascading capacitors, zero-bias Schottky diodes or microelectromechanical system (MEMS) to implement the functionality required for voltage multipliers or rectifiers, charge pumps and signal detectors. Accordingly, when the passive receiver is used in a user device, the reduction in power consumption is considerable. For example, the power consumption in the user device can be reduced to less than 1 mW while the user device stays in idle mode. In order to harvest the full power consumption benefits, the user device equipped with the passive receiver needs to support cellular idle mode functionalities such as cell (re-)selection, paging, random access, system information update and public-warning messages as if the cellular main transceiver does.

SUMMARY

A method for updating system information by a Wireless Transmit/Receive Unit (WTRU). The method comprises: receiving, using an active receiver, system information comprising a first system information set, wherein the first system information set is currently valid for the WTRU; storing the system information; deactivating the active receiver and activating a passive receiver; determining whether a difference between a first parameter in the BSSI and a first parameter in the first system information set is greater than a threshold value, wherein on a condition that the difference is greater than the threshold value, reactivating the active receiver to receive a second system information set as a currently valid system information set for the WTRU.

A Wireless Transmit/Receive Unit (WTRU) for updating system information. The WTRU comprises: an active receiver configured to receive system information comprising a first system information set, wherein the first system information set is currently valid for the WTRU; a memory configured to store the system information; a passive receiver configured to receive a basic set of system information (BSSI); a processor configured to deactivate the active receiver and activate the passive receiver after the active receiver received the system information, and configured to determine whether a difference between a first parameter in the BSSI and a first parameter in the first system information set is greater than a threshold value, wherein on a condition that the difference is greater than the threshold value, the processor is further configured to reactivate the active receiver to receive a second system information set as a currently valid system information set for the WTRU.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
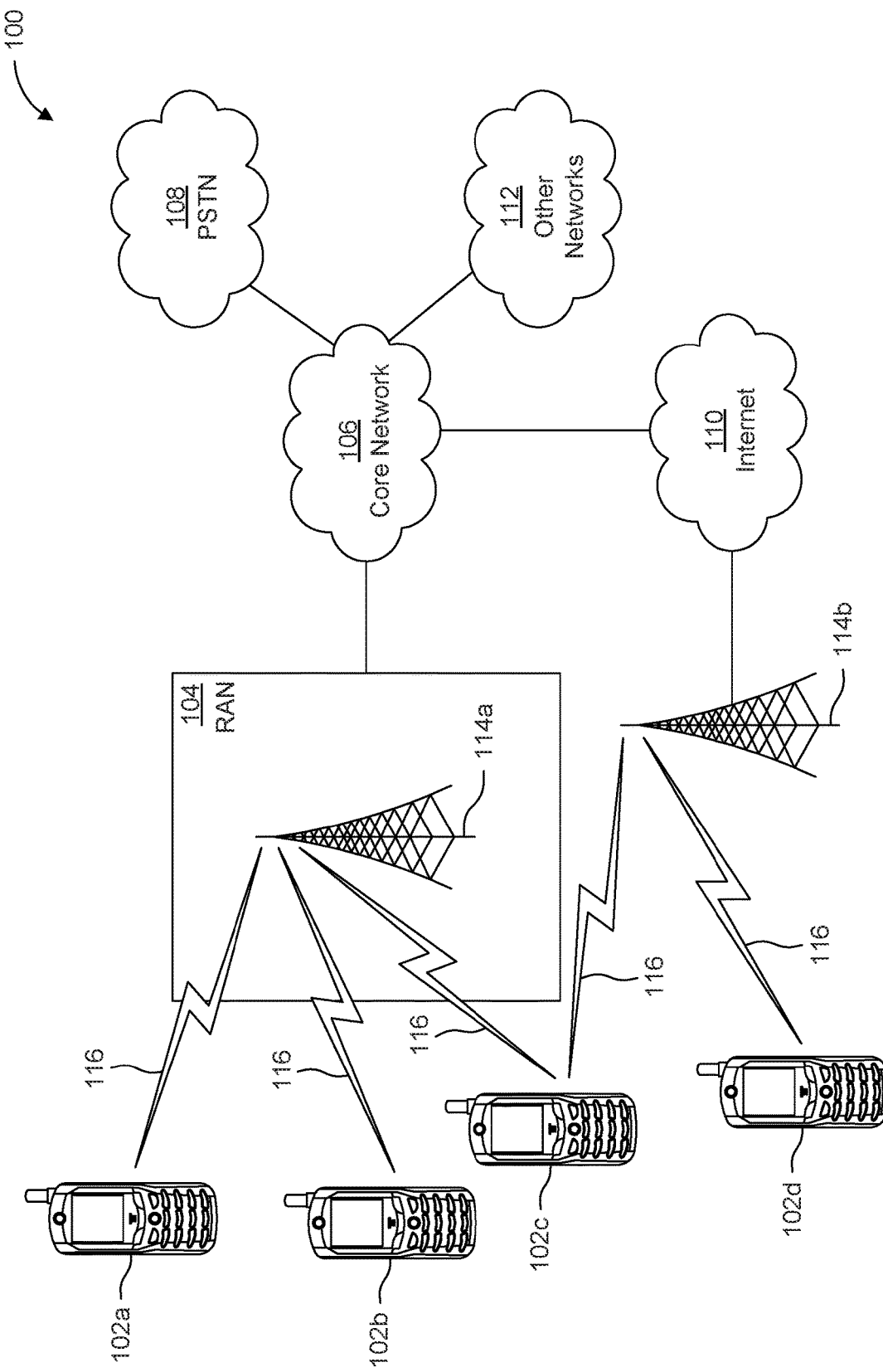
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
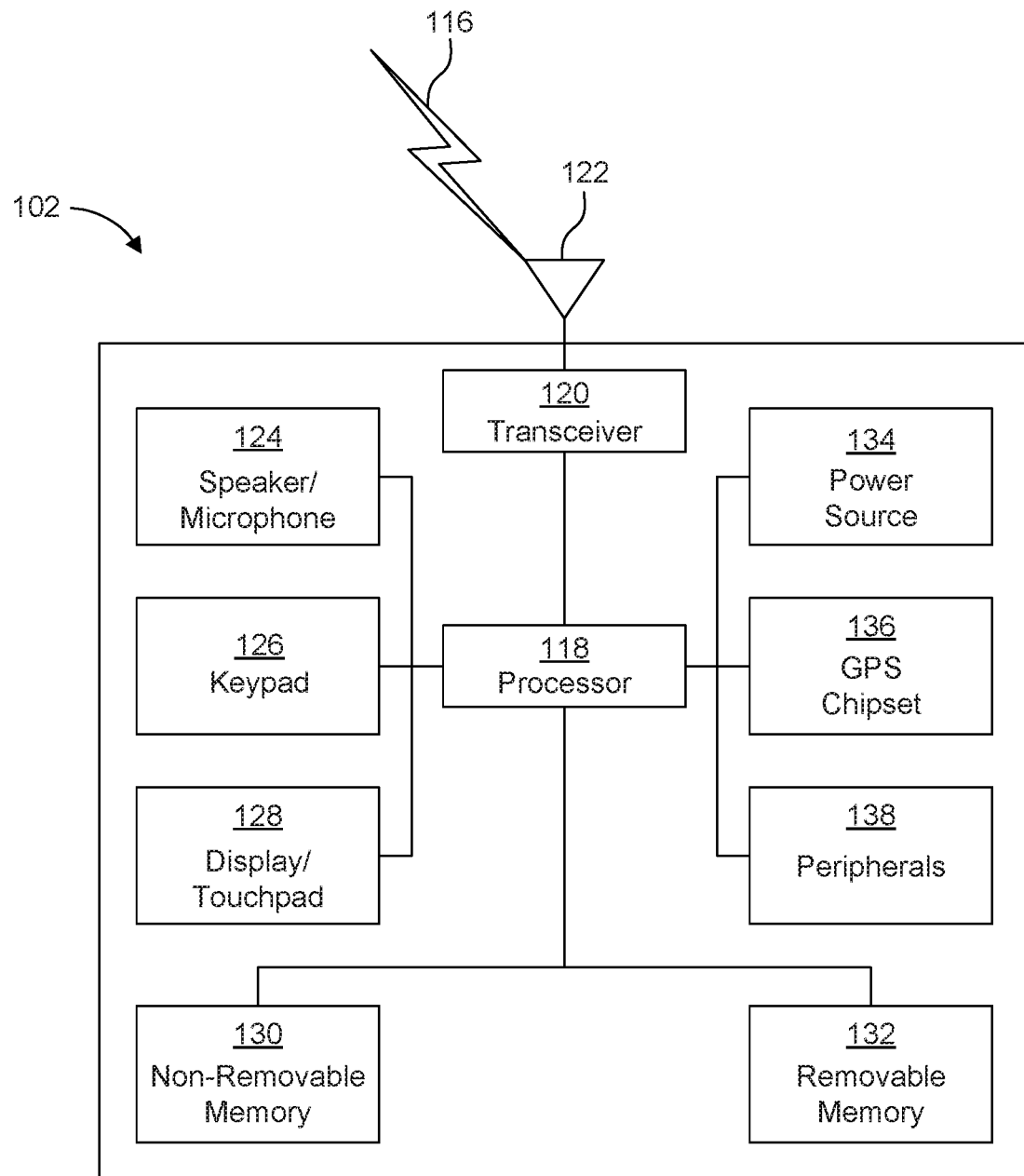
FIG. 1B is a system diagram illustrating an example wireless transmit/receive unit (WTRU) that may be used within the communications system illustrated in FIG. 1A according to an embodiment.
Figure 1C:
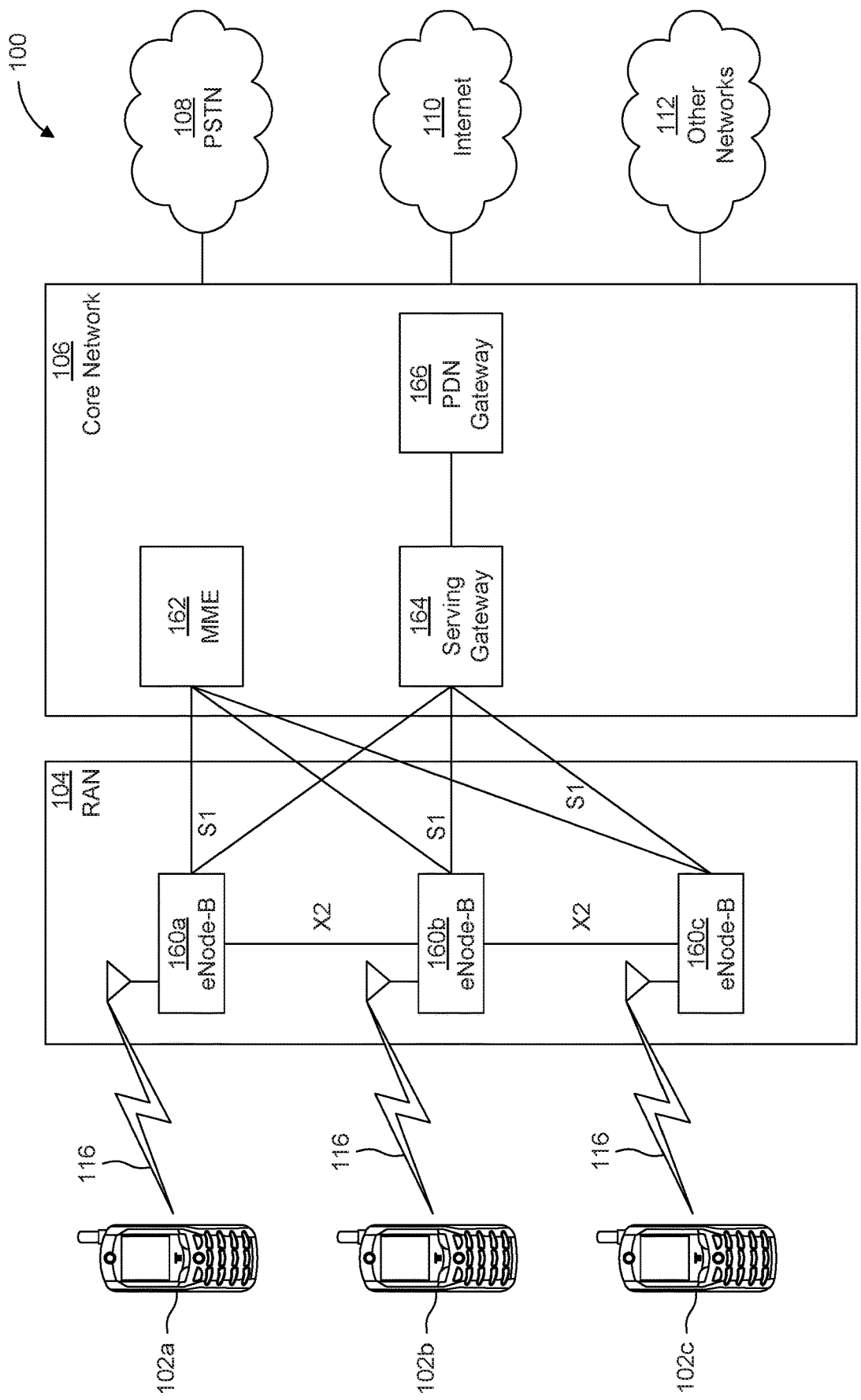
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
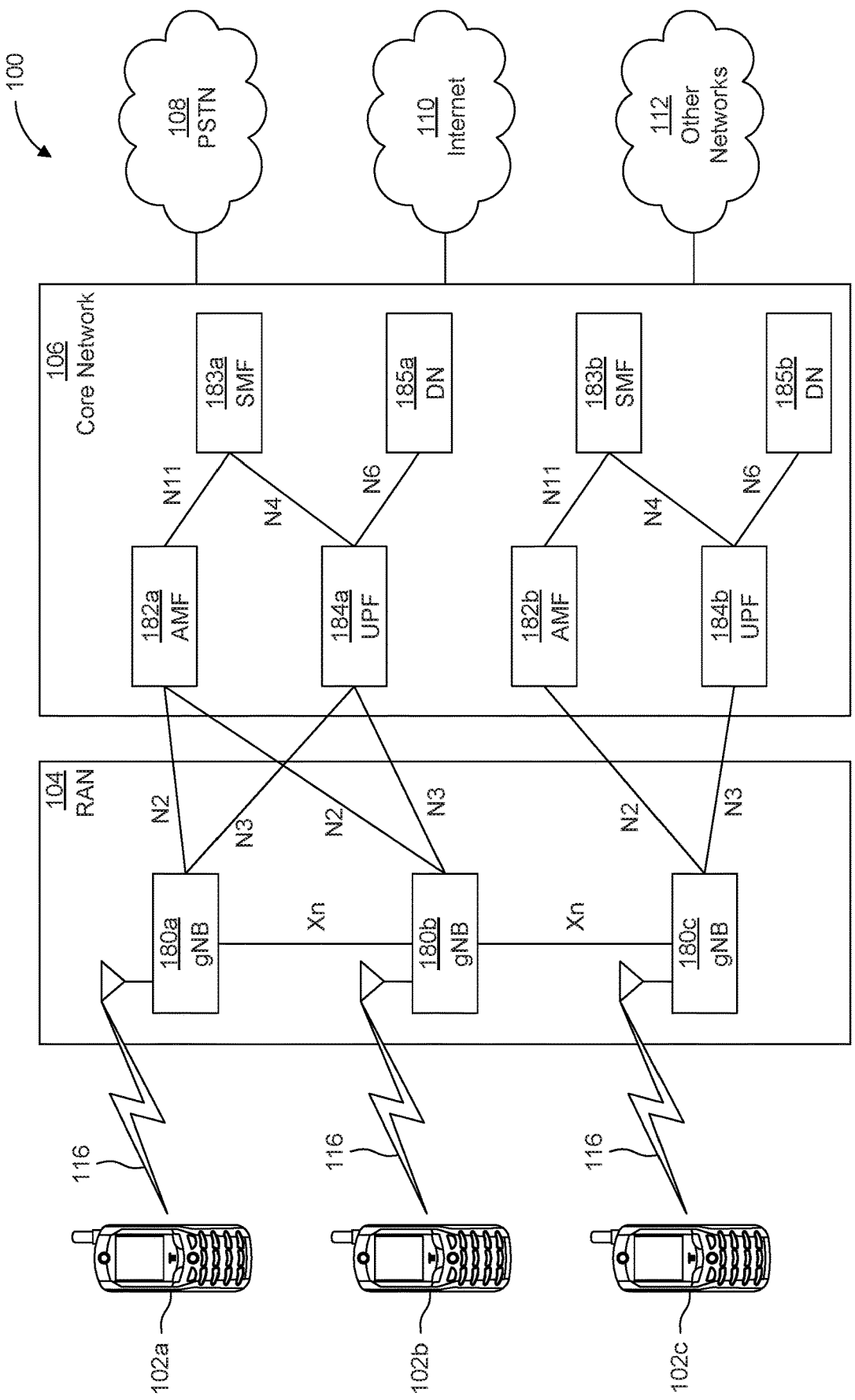
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In state-of-the-art wireless technology such as cellular and WLAN, RF front-ends are usually a mix of passive and active components. For example, passive components may include Rx antennas, Tx/Rx path switches and filters. These passive components require little if any power in order to function. On the other hand, active components require power in order to function. For example, the oscillator to tune to the carrier frequency, the low noise amplifier and the A/D converters in the Rx path are active components.

Advances in RF component design over the last years have made it possible to use a type of RF circuitry such as a passive receiver that can process received RF waveforms which are collected through the antenna front-end by the receiving device in absence of an active power supply. For example, such a device may harvest energy from the received RF waveform to run the necessary circuitry to process signals. These passive receivers may use RF components such as cascading capacitors, zero-bias Schottky diodes, microelectromechanical system (MEMS), or the like to implement the functionality required for voltage multipliers or rectifiers, charge pumps and signal detectors. With these RF components, the passive receivers may operate in the antenna far-field and support large link budgets. This allows reception of radio signals by passive receivers over significant distances.

The passive receiver is a component of the WTRU according to this application, and typically the passive receiver works in a ZE mode or idle mode. Basically, the passive receiver may work with a processor in the WTRU and a transmitter from a base station (e.g., the base station 114a shown in FIGS. 1A-1D). In order to let the passive receiver function properly, there should be protocols and software regarding signal transmissions within a wireless transmission scenario, such as 5G and LTE. All of these protocols, software and hardware (including the passive receiver) may be overall referred to as ZE air interface. Throughout this disclosure, unless otherwise indicated, the terms "passive receiver", "ZE receiver" and "ZE air interface" may be used interchangeably.

Unlike passive receivers, conventional RFID and NFC technologies in low frequency (LF) and high frequency (HF) bands, may operate in the near-field region of the reader antenna. Tags and reader antennas are separated by a small percentage of the carrier wavelength. Therefore, communication is possible over small distances only. In the near-field region, the tag is closely-coupled with the transmitter on the reader. Main receivers or active receivers, such as the tag, then modulate the electromagnetic (EM) field produced by the reader through changing the impedance value that the tag represents to the transmitting reader antenna. By switching between lower and higher relative impedance loads, the tag produces a change that the reader detects in turn. At ultra-high frequency (UHF) and even higher frequencies, the tag is more than one radio wavelength away from the reader, requiring a different approach. Backscattering is used by the tag to modulate the signal.

The active receiver is a component of the WTRU according to this application, and typically the active receiver works in an active mode or non-ZE mode. Basically, the active receiver may work with a processor in the WTRU and a transmitter from a base station (e.g., the base station 114a shown in FIGS. 1A-1D). In order to let the active receiver function properly, there should be protocols and software regarding signal transmissions within a wireless transmission scenario, such as 5G and LTE. All of these protocols, software and hardware (including the active receiver) may be overall referred to as Uu air interface. In order to describe this application in a clear way, throughout this disclosure, unless otherwise indicated, the terms "active receiver", "main receiver" and "Uu air interface" may be used interchangeably.

The passive receivers can perform basic signal detection such as correlation for a known signature waveform and/or they can be put into energy harvesting mode by accumulating energy from the RF waveform entering the receiver front-end through the Rx antenna. Link budgets characteristic of small or medium area cellular base stations may be supported. For example, passive receivers may be used as wake-up radios (WUR) to trigger device internal wake-up and signal interrupts following the detection of wake-up signaling which then may prompt the main modem receiver (or primary connectivity radio) using active RF components to start up. As used herein, the terms passive receiver, passive transceiver, ZE receiver, ZE transceiver, wake-up receiver, wake-up transceiver, companion receiver, companion radio, and wake-up radio may be used interchangeably throughout this disclosure. The terms main receiver, main transceiver, main modem receiver, and primary connectivity radio (PAR) may be used interchangeably throughout this disclosure.

The reduction in device power consumption is considerable when passive receivers are used. A typical cellular 3G, 4G or 5G modem transceiver may easily require up to a few hundred mWs in order to demodulate and process received signals during active reception such as in connected mode (e.g., RRC_CONNECTED). Power consumption scales with the number of RF front-end chains active on the device, the channel bandwidth used for reception, and the received data rate. When the device is in RRC_IDLE mode with no data being received or transmitted, cellular radio power saving protocols such as (e)DRX may ensure that the receiver may only need to be powered on a few times per second at most. Typically, the device then performs tasks such as measuring the received signal strength of the serving and/or neighbor cells for the purpose of cell (re-)selection procedures and reception of paging channels. In addition, the device performs automatic frequency control (AFC) and channel estimation in support of coherent demodulation. Device power consumption when in idle mode (e.g., RRC_IDLE) is in the order of several mWs. In R15 enhanced machine-type-communication (eMTC) and narrowband Internet of Things (NB-IoT), sequence detection circuitry for processing of in-band wake-up signals in RRC_IDLE mode may also be implemented in the form of a dedicated wake-up receiver or passive receiver. This allows a device to power down the analog/digital (ND) converters and significant parts of the digital baseband processor. However, several active components in the RF front-end such as low-noise amplifiers and oscillators may still be used. With the passive receiver, device power consumption in idle mode (e.g., RRC_IDLE) may be reduced to, for example, about 1 mW.

WTRUs implementing either one or a combination of 2G, 3G, 4G and/or 5G RATs may perform public land mobile network (PLMN) selection, cell selection/re-selection and location registration procedures while in RRC_IDLE mode. Depending on capabilities, some devices may also support manual closed subscriber group (CSG) selection or multimedia broadcast multicast service (MBMS) frequency prioritization in RRC_IDLE mode. 5G devices may support RAN-level notification area (RNA) updates and operation in RRC_INACTIVE state.

When a WTRU is switched on, a PLMN is selected by the WTRU. For the selected PLMN, associated RAT(s) may be set. With cell selection, the WTRU may search for a suitable cell of the selected PLMN, choose that cell to provide available services, and monitor its control channel. The WTRU may register its presence by means of a NAS registration procedure in the tracking area of the chosen cell.

While in RRC_IDLE, a WTRU performs received signal strength measurements on serving and/or neighbor cells. If the WTRU finds a more suitable cell according to the cell reselection criteria, it may reselect onto that cell and camp on it. If this new cell does not belong to at least one tracking area to which the WTRU is registered, location registration may be performed. The WTRU may also search for higher priority PLMNs at regular time intervals and search for a suitable cell if another PLMN has been selected by its NAS.

If a WTRU loses coverage of the registered PLMN, either a new PLMN is selected automatically or an indication of available PLMNs is given to the user so that a manual selection can be performed. Various means of control may exist for the network to prioritize cell selection onto certain RATs, to control the rate at which low, medium or high mobility WTRUs perform cell re-selection and to bar selected tracking areas from re-selection by WTRUs.

When the WTRU camps on a cell in RRC_IDLE state or in RRC_INACTIVE state, the WTRU may: (1) receive system information (e.g., system information block) from the PLMN; (2) establish an RRC connection or resume a suspended RRC connection; and/or (3) receive earthquake & tsunami warning system (ETWS) or commercial mobile alert system (CMAS) notifications. Moreover, if the network needs to send a control message or deliver data to a registered WTRU, it knows in most cases the set of tracking areas in which the WTRU is camped. A paging message can then be sent to the WTRU on the control channels of all the cells in the corresponding set of areas. The WTRU may then receive the paging message and can respond to the paging message.

Unlike existing state-of-the-art devices, a WTRU implementing a passive receiver may benefit from near zero power consumption when it is not actively performing transmission or reception for the purpose of exchanging data and control signaling with the network.

Given that such devices are mobile, it is necessary for the network to track the approximate location of WTRUs implementing a passive receiver at least at the tracking area level. Transmission of paging messages and wake-up signaling may require use of DL transmission resources by the network in terms of power, spectrum and time resources, therefore creating DL interference and reducing DL system capacity. If paging and wake-up signaling were to be transmitted to a WTRU over entire PLMNs or significant parts of their geographical coverage not knowing the whereabouts of the WTRU, the use of DL transmission resources would quickly become prohibitively large. WTRUs implementing a passive receiver therefore need to support cell (re-)selection in idle mode in combination with tracking area update procedure(s).

Similarly, WTRUs implementing a passive receiver may be expected to shut down all or significant parts of the main cellular modem receiver while operating in idle mode, such as exemplified by RRC_IDLE and/or RRC_INACTIVE modes. When paging or wake-up signaling is transmitted by the network to the passive receiver in the device, it may be necessary to start up the WTRU's main modem transceiver which may incur a significant time delay, and which is costly in terms of battery power consumption. Most of the cold start delay results from determining a cell to camp on during initial cell selection which often implies measuring a great many different frequencies and operating bands over prolonged periods of time even if a PLMN is already preselected. WTRUs implementing a passive receiver therefore need to support cell (re-)selection in order to dramatically reduce start up times and power consumption when required to start their main modem transceiver.

In the context of idle mode operation, a WTRU equipped with a passive receiver may implement a paging procedure and wake-up command. Additionally, the WTRU equipped with the main cellular modem may implement the supplementary use of transmitted wake-up signals delivered in-band prior to the imminent arrival of existing downlink control information (DCI) using paging-radio network temporary identifier (P-RNTI) on physical downlink control channel (PDCCH) and physical downlink shared channel (PDSCH) carrying paging message(s) for LTE eMTC and NB-IoT.

In order to harvest the full power consumption benefits achievable with multi-mode devices equipped with passive receivers when these are put in idle mode, it is necessary to support cellular idle mode functionalities when using a ZE radio, as if the cellular main modem was used. If existing cellular radio idle mode functionality was supported only partially by a passive receiver, then the use of the passive receiver in idle mode by multi-mode WTRUs would be associated with a heavy penalty.

Firstly, cellular devices performing the cell (re-)selection procedures in idle mode determine a serving cell by means of measurements and a set of configurable evaluation criteria. For example, these criteria and evaluation parameters are used to compare a current serving cell to measured neighbor cells on the same or on different frequency channels, to distinguish between low- and high-speed WTRUs or to prevent unnecessarily high measurement activity by the device. If only paging procedures were supported by a WTRU operating a passive receiver in RRC_IDLE, there would be no means for the device to meaningfully perform a cell (re-)selection procedures when moving.

Secondly, when a cellular multi-mode device initiates a connection establishment procedure with a serving cell, it needs to perform random access. Because devices are usually not time- and frequency-aligned prior to receiving control signaling from the network, UL interference may need to be controlled. Specifically, allocated time-/frequency resources with sufficient guard intervals and guardbands and a set of random access preambles for low complexity detection may be set aside for the purpose of UL random access. In a cellular system employing sectorization and/or beamforming, random access resources may also be used by the network to distinguish cellular devices during initial access in order to provide sufficient common control channel coverage. Cellular devices commonly decode and store information pertaining to the use of UL radio resources for the purpose of random access from DL system information broadcast information. A significant penalty in terms of connection establishment delay may be incurred if the UL access parameters were unknown or to be determined by the WTRU just prior to the start of the random access procedure using the main cellular modem.

Thirdly, cellular WTRUs need to routinely re-acquire general DL system information for purposes such as the reception of updates to cell (re-)selection, UL random access, connection establishment and other parameters. One of the ways changes in system information contents are announced by the network to WTRUs is by means of system change notification messages. This is in order to avoid that WTRUs re-read all broadcasted system information contents, changed or unchanged, regularly. If only paging was supported by a passive receiver in Idle Mode, then the use of the main cellular modem for DL reception would again become necessary. This may result in an undue power consumption penalty for a WTRU using its passive receiver while in Idle Mode.

Fourth, cellular WTRUs need to monitor DL signaling channels for the purpose of receiving public-warning messages (e.g., ETWS, PWS and CMAS). Support for this type of device functionality in idle mode is mandated by regulatory requirements. Delivery of these public-warning messages is by definition time-critical. If multi-mode WTRUs operate in RRC_IDLE using a passive receiver and the reception of public warning messages when put in RRC_IDLE is not possible, then use of ZE radio technology in the context of multi-mode cellular devices may not be viable.

Fifth, cellular devices operating in (e)DRX while in RRC_IDLE receive paging according to a time-synchronized protocol defined in terms of paging opportunities and paging time windows which are determined using timers and which are pseudo-randomized according to device and network identifiers to distribute signaling load. A WTRU using a passive receiver while in idle mode may require an energy harvesting and accumulation phase for the reception of signaling. The amount of energy the WTRU can harvest may depend on its radio distance to the transmitter and the DL transmission settings; energy accumulation duration may vary over time. It can be expected that in general it will not always be possible for the network to ensure delivery of paging to WTRUs using their passive receiver in a perfectly time-synchronized and coordinated manner.

From the above considerations, methods and apparatuses are needed in order to allow WTRUs with passive receivers to operate in idle mode implementing multiple critical system signaling procedures in a manner suitable to the particular needs and characteristics of passive receiver technology.

As used herein, the WTRUs equipped with passive receivers may refer to multi-mode RAT devices supporting either one or a combination of the following: 2G GSM/EGPRS, 3G WCDMA/HSPA, 4G LTE/eMTC/NB-IoT, 5G NR, or the like. These devices may also include Wi-Fi, Bluetooth, GPS, or the similar functionality.

As used herein, the passive receiver in a WTRU may operate in-band and/or on a dedicated band. In-band operation may refer to ZE signaling for passive receivers carried inside or in a portion of an operating band/frequency channel where the main modem receiver also operates. For example, both are transmitted in a 20 MHz channel in LTE/NR Band 1. The dedicated band operation may refer to ZE signaling carried in it a frequency channel distinct from the main modem cellular DL/UL. For example, ZE signaling is transmitted in a 1 MHz wide portion of the 700 MHz band, but the main modem receiver operates in a 20 MHz wide channel of LTE/NR Band 1.

Embodiments described herein may describe how to support signaling suitable to the particular nature of the ZE waveforms requiring RF energy harvesting for decoding.

Figure 2:
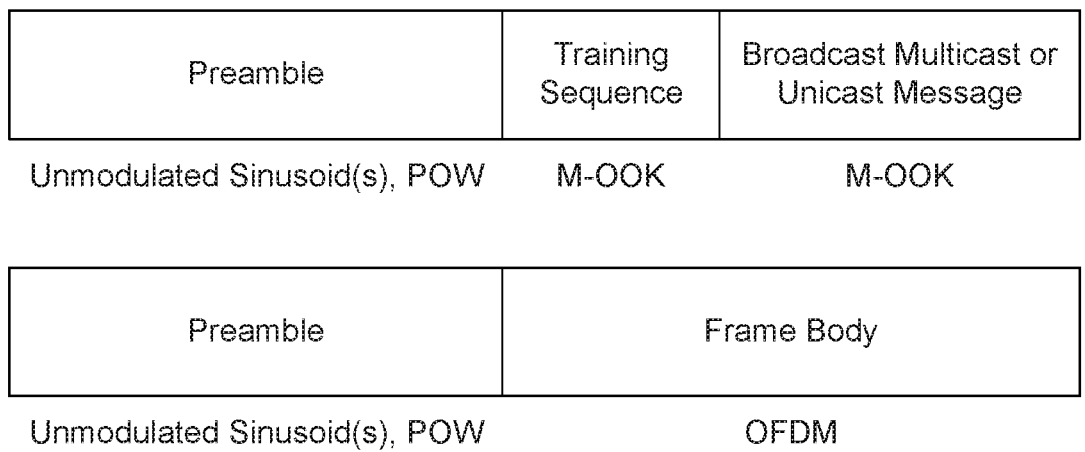
FIG. 2 is a diagram illustrating an example zero-energy (ZE) signal construction.

FIG. 2 illustrates two examples of zero-energy (ZE) signal construction. In FIG. 2, these two examples illustrate two potential frame formats that may be used over the ZE air-interface to convey any of the messages described in this application, e.g. Paging notification message or System Information Change Notification message. In both formats, the frame starts with a Preamble that can be used to identify the beginning of the frame as well as provide energy to the WTRU using a Power-Optimized Waveform. The difference between the two formats is the existence of a training sequence in one of them, which can be used to provide a more robust method for the identification of the beginning of the frame body or to assist in the detection of some of the parameters that is required for the proper decoding of the message/frame body.

Figure 3:
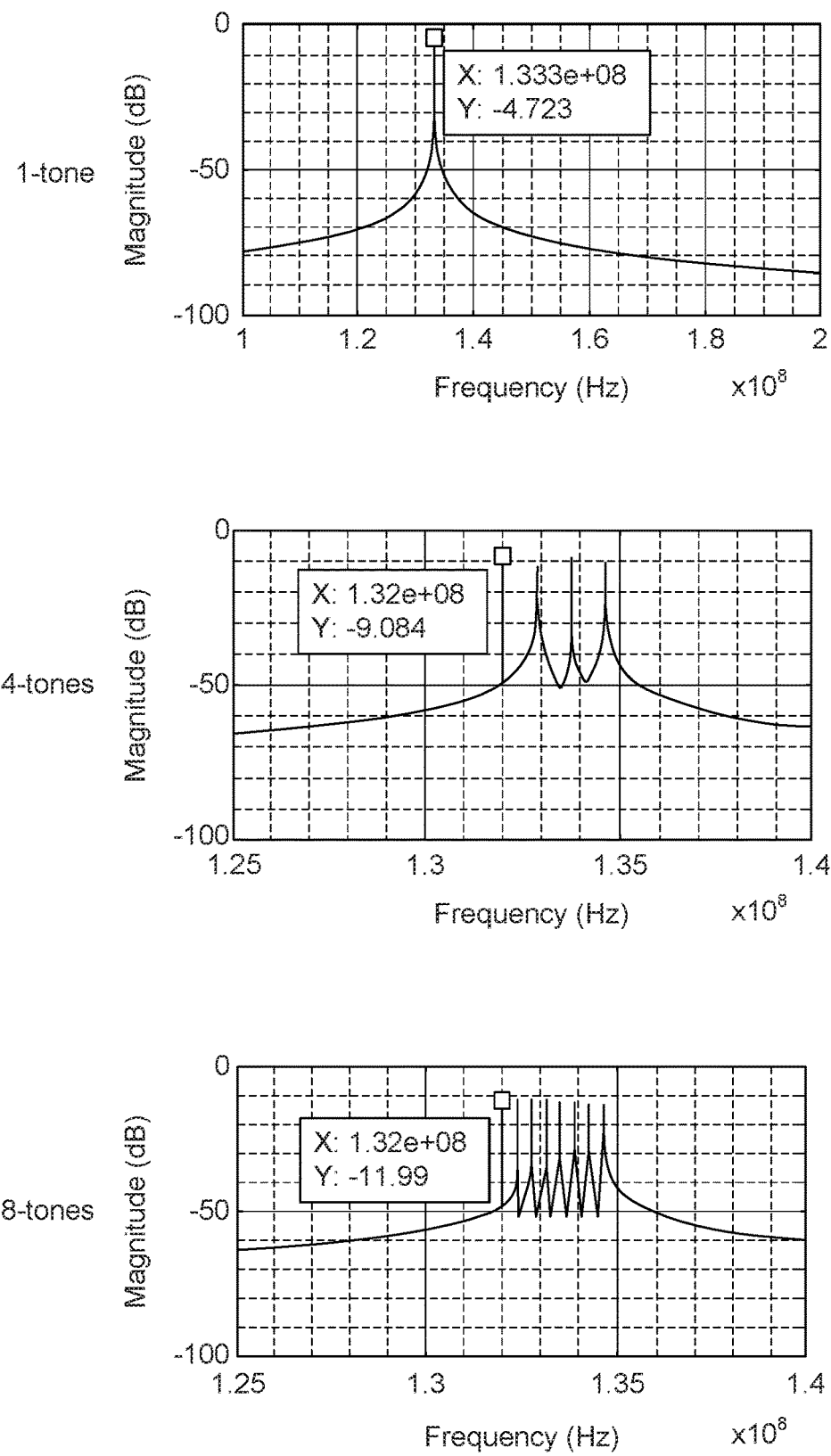
FIG. 3 is a diagram illustrating an example multi-tone transmission for power-optimized waveforms.

FIG. 3 illustrates an example multi-tone transmission for power-optimized waveforms described in FIG. 2. To be more specific, FIG. 3 provides exemplary frequency responses of potential power-optimized waveforms that can be used in the construction of the ZE frame formats shown in FIG. 2.

As illustrated in FIG. 2, a passive receiver in a WTRU may process a transmitted ZE waveform comprised of one or more power-optimized waveform part(s) and signaling part(s). For example, transmission of a power-optimized waveform part may be done by means of a preamble part where selected sinusoid(s) or multi-tone transmissions are sent over a portion of a frequency spectrum. A frame body may be transmitted using a modulation or multiplexing scheme. For example, on-off keying (OOK), frequency-shift keying (FSK), bi-phase-shift keying (BPSK), quadrature-phase-shift keying (QPSK) and TDMA, FDMA, CDMA or OFDM may be used to transmit information. The frame body may be used by the passive receiver to determine and process the control and/or data signaling as illustrated in FIGS. 2 and 3. ZE waveforms may be used to determine channel state and/or reception conditions.

Figure 4:
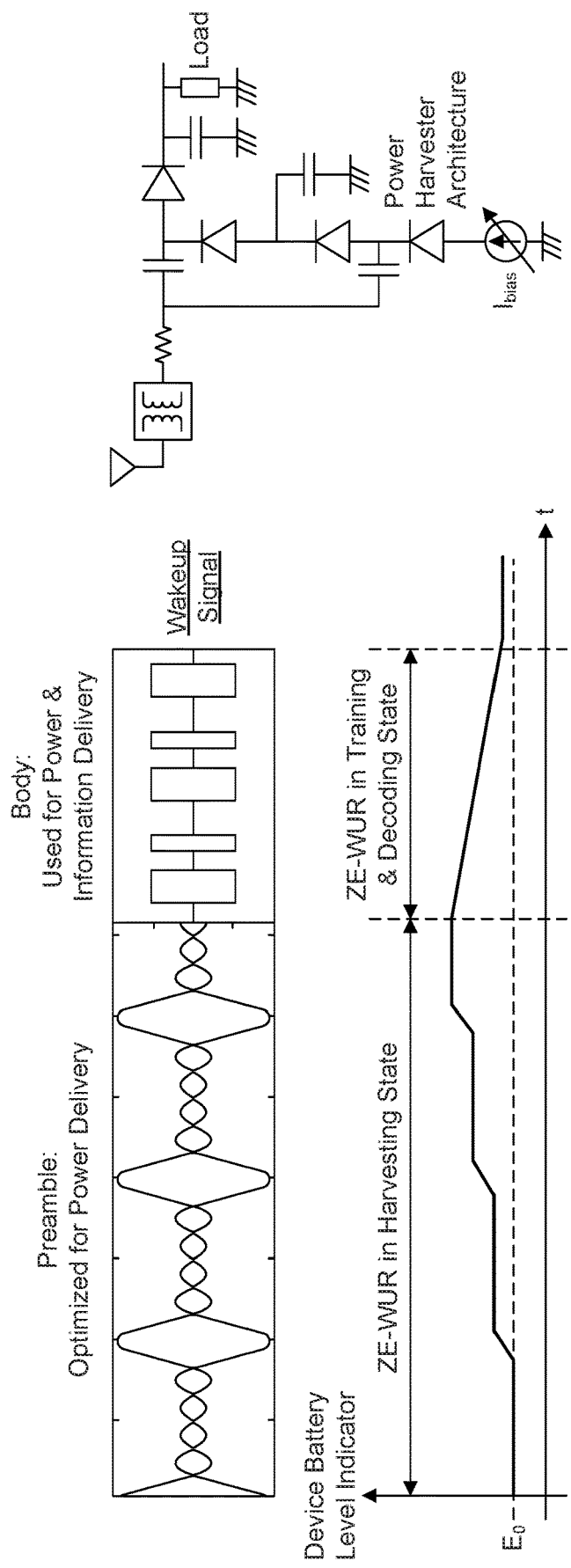
FIG. 4 is a diagram illustrating an example ZE signal structure and energy-harvesting profile.

FIG. 4 illustrates an example ZE signal structure and energy-harvesting profile. A passive receiver may harvest or accumulate energy from the received power-optimized waveform and/or signaling parts as illustrated in FIG. 4. POW and/or signaling parts may be associated with a measured or observed energy signature or sequence.

Figure 5:
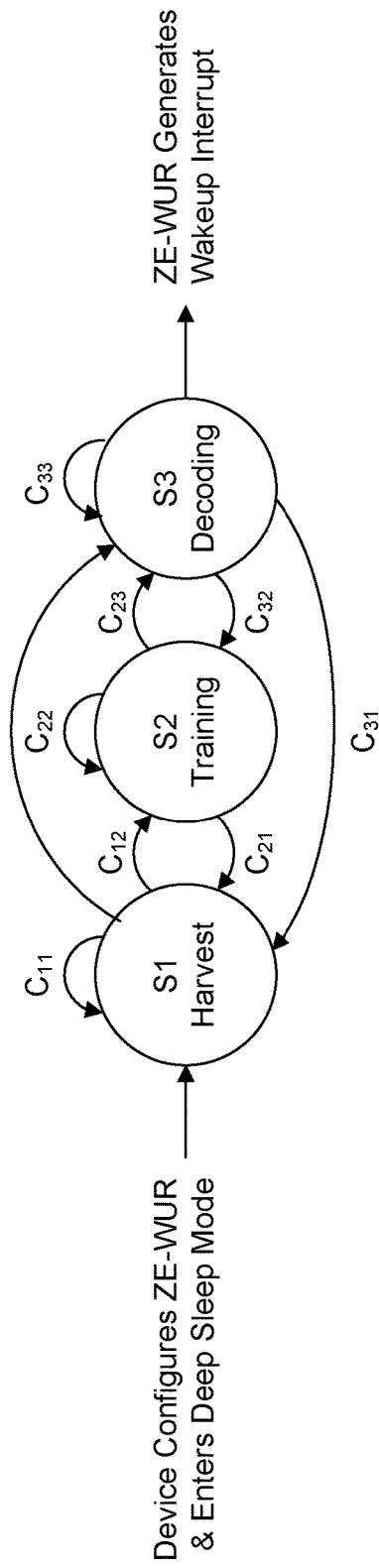
FIG. 5 is a diagram illustrating an example state machine of a ZE receiver.

FIG. 5 illustrates an example state machine of a ZE receiver. As illustrated in FIG. 5, processing of received ZE signaling by the passive receiver may occur according to well-defined processing states and transition conditions between these states. For example, an energy-harvesting state and a decoding state may represent passive receiver processing while accumulating energy prior to processing an information-bearing signal(s). Each of the states defines the conditions to perform the main function of the state, i.e. "energy harvesting" or "training" or "decoding", as well as the transition conditions from that state to others. One example realization of state transitions can be described in light of the first frame format in FIG. 2, where a device receives a ZE frame and utilize the Preamble to accumulate energy till it reaches a specific threshold, then transitions to the next state "training state" where the training sequence is utilized to acquire a detection threshold required for the next state "decoding state" where decoding of the frame's main body happens. Failure to achieve the goal of any of those states may require the device to either stay in the same state or revert to a previous one.

Figure 6:
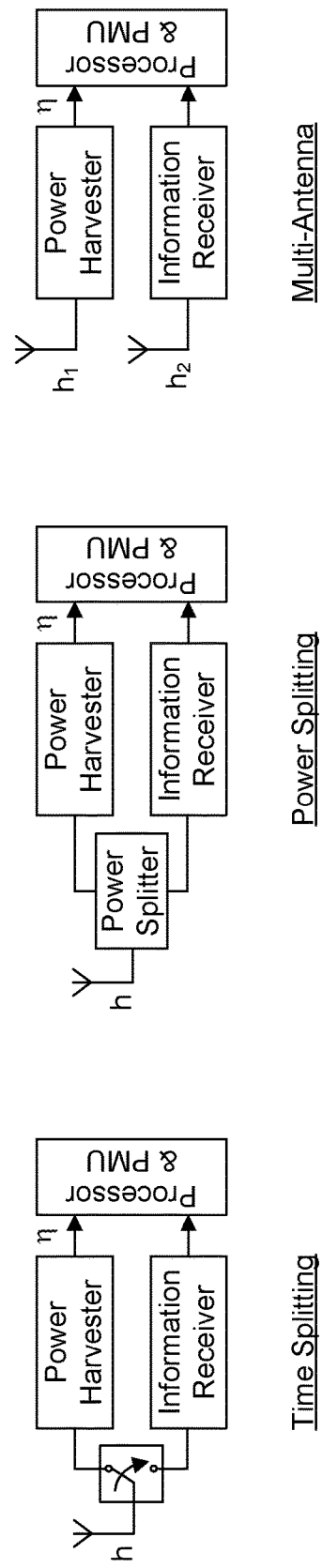
FIG. 6 is a diagram illustrating an example concurrent delivery of power and information.

FIG. 6 illustrates an example concurrent delivery of power and information. As illustrated in FIG. 6, transmissions of power-optimized waveform and/or signaling parts may occur according to TDM, FDM, SDM and/or power-domain multiplexing principles where ZE signaling parts do not necessarily need to be contiguous. The type of receiver architecture used will impact the format of the ZE signal used to convey any of the notification messages described in this document. For example, the time splitting architecture requires the ZE signal to be split into two portions in time, a first portion representing the preamble that will be used to transfer energy to the receiver which will subsequently be used to decode the second portion of the ZE signal. For power splitting and multi-antenna techniques, both the energy transfer and information transfer components of the ZE signals can be transmitted simultaneously. However, the power splitting technique will have a trade-off that needs to be considered between information decoding quality and energy harvesting quantity.

Embodiments for signal detection using ZE waveforms are described herein.

In a first embodiment, a WTRU with a passive receiver may process a ZE notification signal determining a transmission format with known (or predetermined) transmission characteristics and/or known (or predetermined) signaling indication(s).

Without loss of generality, the signal detection for a ZE notification signal described herein may be applied to notifications delivered using a passive receiver for purposes such as system change notifications, emergency or public warning notifications, paging notifications, or the like.

In a first technical realization, either one or a combination of the following transmission characteristics associated with a ZE signal waveform or one or more of its ZE waveform parts may be known or predetermined by a passive receiver while processing a ZE notification signal. Examples of such transmission characterises include, but are not limited to: (1) transmission duration(s) such as absolute time duration or relative time duration compared to a reference value; (2) transmission format such as modulation scheme and its parameterization, modulation order, number or placement of sequence of tones, and make-up of the ZE waveform part comprised as part of a ZE notification signal; (3) power or power profile such as peak power, average power, a value representative of first or N-th order power distribution profile statistics such as PAPR including the possibility of adjustment factors when calculating these; (4) energy profile or signature, such as the number, distribution and/or separation of energy accumulation and thresholding events; and (5) transmission settings in use by the transmitter of a ZE notification signal such as frequency location, transmission pattern or sequences if one or more transmission parameters are changed to randomize interference contributions and/or to improve robustness of transmissions Transmission characteristics associated with a ZE notification signal for use with a passive receiver may be preconfigured, known and stored in memory in the WTRU. Alternatively or additionally, these transmission characteristics may be signaled and configurable in the WTRU. For example, network nodes such as MME or eNB may use control signaling in the form of NAS, RRC, MAC CE or L1 signaling using the main cellular modem when active to configure and/or indicate transmission formats for the purpose of notification delivery using a passive receiver by a WTRU.

Knowledge of some or all of the transmission characteristics may allow the WTRU with a passive receiver to increase the detection robustness for the ZE notification signal and to extend the coverage range.

Figure 7:
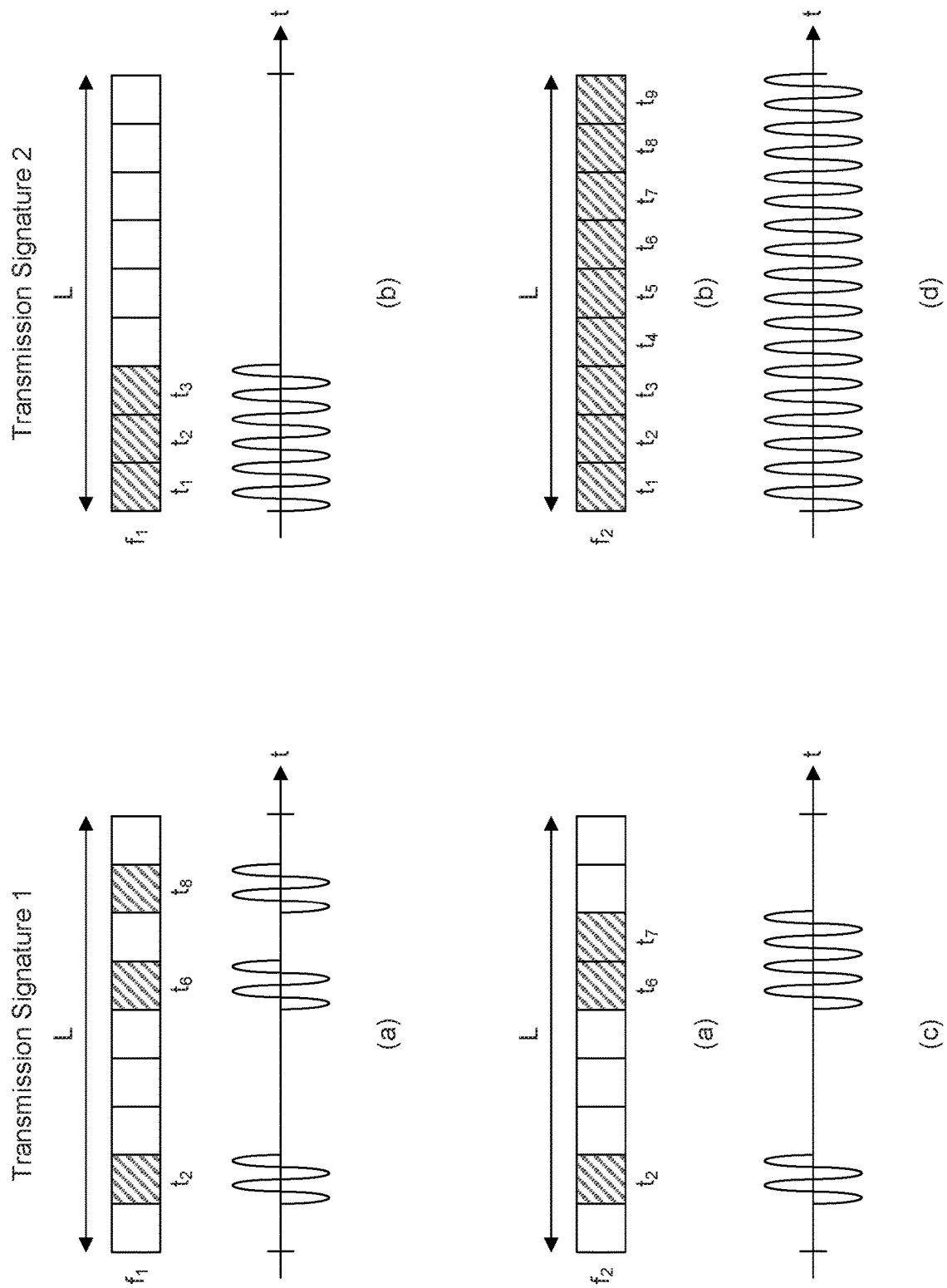
FIG. 7 is a diagram illustrating example transmission signatures.

FIG. 7 illustrates example transmission signatures or format. The POW may be a two-tone signal in frequency domain and be transmitted on a subcarrier f1 and a subcarrier f2. A transmission sequence may comprise multiple symbol intervals, for example, up to 9 symbol intervals in time. As illustrated in FIG. 7, a known ZE notification signal defined for the POW part of a ZE signal may use transmission signature 1 (left) known to the WTRU using 3 out of 9 symbol intervals on f1 and 3 out of 9 symbol intervals on f2. The overall resulting time-domain waveform (not shown in FIG. 7) may allow for energy-harvesting by the device due to its PAPR.

Figure 8:
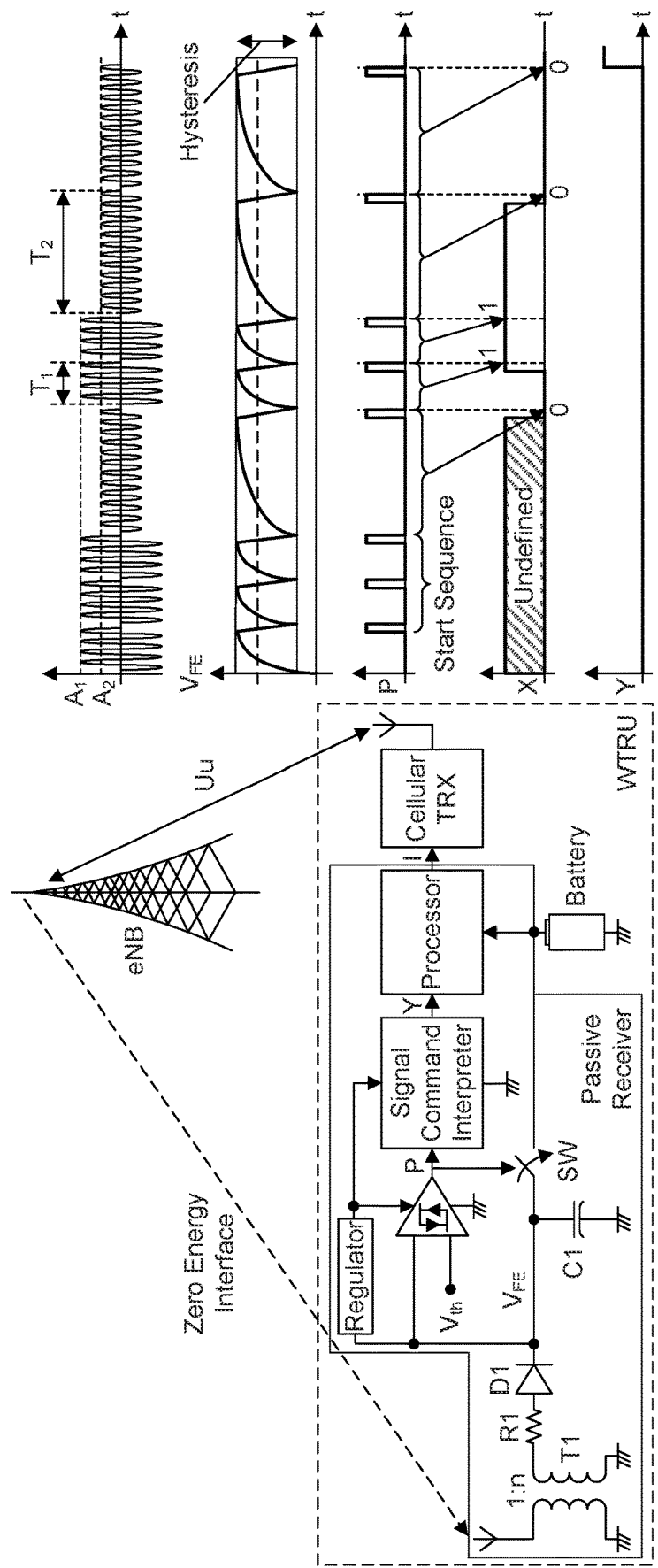
FIG. 8 is a diagram illustrating an example detection sequence when a WTRU processes a known ZE reference transmission format.

FIG. 8 illustrates an example detection sequence when a WTRU processes a known ZE reference transmission format. As illustrated in FIG. 8, the WTRU passive receiver may detect presence of the transmission signature 2 by accumulating against its known energy signature. Upon detection of this signature, the WTRU passive receiver processor may determine presence of a ZE notification as described further on.

In an alternative or additional technical realization, a WTRU with a passive receiver may determine presence of a ZE notification signal from decoding a ZE signaling part. One or more selected bit flag(s), symbol sequence(s) or identified transmission characteristics may be used to signal to the WTRU that a particular transmitted ZE waveform represents a ZE notification signal. Indication through explicit signaling (i.e. signal indication) may allow the passive receiver to decrease detection complexity using a generic signaling format (e.g., energy signature, distinguishing payload contents through the carried bits or the like).

Detection by the WTRU of a received ZE notification signal may combine both aspects; the notification signal may be decoded by the device assuming both a fully or partially known transmission format, possibly from a set of possible candidate transmission formats and explicit signaling obtained from decoding a ZE waveform.

A ZE notification signal may be transmitted one or multiple times. The ZE notification signal may be repeated. This means that the same notification may be transmitted using multiple instances. Alternatively or additionally, a ZE notification signal may be transmitted to a WTRU by means of multiple ZE POW or signaling parts using multiple transmission instances.

WTRUs with passive receivers may or may not account for presence of multiple transmitted versions of a ZE notification signal. If a single ZE notification signal out of multiple transmitted instances is received and decoded by the WTRU, the WTRU processor may act on that decoded instance. If multiple instances are received by the WTRU, the WTRU may combine multiple received ZE notification signal instances to improve its detection performance.

Using multiple instances to transmit a ZE notification signal may allow a WTRU to decrease probability of missed detection in the WTRU.

In a second embodiment, a WTRU with a passive receiver may process incoming ZE notification signal(s) according to a reception schedule (e.g., a well-determined or predetermined reception schedule).

A reception schedule may be used by the WTRU to determine the possible occurrences, instances or transmission opportunities of ZE notification signals. For example, a ZE notification signal may be transmitted every N ms for a number of M times.

It is noted that due to the use of a designated reception schedule for delivery of ZE notification signals, sufficient energy accumulation intervals can be set aside to permit a WTRU with a passive receiver to decode received ZE notifications with high reliability.

The possible reception schedule may be valid for individual WTRUs with a passive receiver or for a group of WTRUs. The reception schedule may be tied to the occurrence(s) of other detectable signaling events using ZE signaling waveforms. For example, a configured reception schedule for delivery of ZE notification signals may be activated or de-activated using another ZE signal. Assuming that the WTRU with a passive receiver has determined a reception schedule through stored information or has been configured by means of signaling as described further on, a first ZE notification signal used as activation for the reception schedule. Before reception of that first ZE notification signal used as activation, the device may not monitor transmission opportunities according to the reception schedule. Following the reception of the activation signal, the device may start monitoring possible reception instances according to the schedule for occurrences of ZE notification signals. Similarly, a de-activation type of ZE notification signal can be transmitted to the device. Following its reception, the WTRU may stop monitoring possible occurrences of ZE notification signals according to the schedule.

A schedule for the processing of received ZE notification signals may be comprised of either one or a combination of the characteristics associated with ZE waveform or signaling part(s). Examples of such characteristics include, but are not limited to: (1) cycle length or duration; (2) number of possible occurrences of ZE notification signal(s); and (3) timer value.

For the cycle length or duration including designated time intervals, ZE notification signal(s) may or may not be transmitted. For example, an instance of a ZE notification signal may be transmitted every N msec. alternatively or additionally, N instances may be equally spaced in time. Alternatively or additionally, N instances may be sent according to a designated transmission pattern in time or frequency in a duration of N ms. Alternatively or additionally, a first period of duration T1 with N possible transmission instances of ZE notification signal(s) may be followed by a second period of duration T2 with no allowed transmission instances until the beginning of next duration T1 and this sequence repeating For the number of possible occurrences of ZE notification signal(s) for a transmission instance, a ZE paging signal, for example, may be transmitted once per transmission opportunity, and indicated as such, or it may be transmitted for a number N1 times in a determined designated time interval(s), possibly including a sequence thereof with a separation between individual transmission opportunities.

For the timer value, a WTRU may determine\ the expected occurrences for processing ZE notification signals from one or more timer values and at least a second parameter. For example, according to a timer value of 3 sec together with a known or derived start time and recurrence period of every 0.5 s, the WTRU determines that the ZE paging signal may be transmitted 6 times.

A reception schedule associated with a ZE notification signal for use with a passive receiver may be pre-configured, known and stored in memory in the WTRU. Alternatively or additionally, the schedule may be configurable in the WTRU. For example, network nodes such as MME or eNB may use control signaling in the form of NAS, RRC, MAC CE or L1 signaling using the main cellular modem when active to configure and/or indicate parameters associated with such a schedule for the purpose of delivery of ZE notification signals using a passive receiver by a WTRU.

A WTRU with a passive receiver processing a ZE notification signal may first determine a reception schedule. For example, the WTRU determines that the transmission instances of ZE notification signal will occur according to a sequence of time instances T1, T2, T3, . . . , TN. Next, the WTRU may configure its passive receiver to process any received ZE notification signal according to the configured sequence of determined time instances. For example, the WTRU sets the beginning of a possible energy accumulation interval for the ZE POW part to a value sufficiently large in order to meet the designated minimum threshold level of X when attempting to decode a ZE signaling part at a determined time instance. Then, the WTRU may receive a ZE signal part at or following the determined time instance.

Embodiments for system change notification are described herein.

In a first embodiment, the ZE notification signal may correspond to a signaling message indicating, representing or announcing change of selected DL system information contents.

For example, the ZE system change notification signal processed by the passive receiver may indicate that system information has changed. Specifically, a first signaling value may indicate that system information has changed. A second signaling value may indicate that no such change occurred. Alternatively or additionally, presence or absence of such ZE system change notification signal may imply that a change occurred or did not occur. First, a WTRU may determine that system information has changed by means of using the passive receiver processing an incoming ZE system change notification. Second, the WTRU may determine more details about the indicated changes to system information. Third, either the passive receiver or the main cellular modem may be used by the WTRU.

In another example, the ZE system change notification signal may indicate change to either all or a selected subset of system information messages and/or blocks valid for a cell, a group of cells, a tracking or routing area, possibly referring to a given frequency band or on a selected frequency channel.

Processing of a received ZE system change notification by the WTRU may be based on the use of known transmission characteristics, signaling indications, multiple transmission instances or a reception schedule such as described earlier.

Processing of a received ZE system change notification by the WTRU with a passive receiver may be associated with the use of a modification period. For example, a notification message received in a time interval T1 to T2 may indicate a change applying from time instant T2 onwards.

In a first technical realization, a received ZE system change notification signal may indicate directly in its bit representation which parts of a system information message, block or content are or will be changed. For example, a signaling part of a ZE waveform may be used to carry the bit representation.

In an alternative technical realization, the received ZE system change notification may represent an index value which is used by the WTRU to look up detailed values corresponding to the information about which parts of a system information message, block or content are or will be changed. This approach may greatly reduce the signaling load of the ZE waveform, therefore extending range, because more time is possible for energy accumulation by the passive receiver.

Information associated with a change of system information for use with a ZE notification signal by a WTRU equipped with a passive receiver may be pre-configured, known and stored in memory in the WTRU. Alternatively or additionally, this information may be signaled and configurable in the WTRU. For example, network nodes such as MME or eNB may use control signaling in the form of NAS, RRC, MAC CE or L1 signaling using the main cellular modem when active to configure and/or indicate information associated with system information or a change to system information using a passive receiver by a WTRU.

In one example procedure, a WTRU with a passive receiver processing a ZE system information notification may determine one or more transmission characteristics for the signaling waveform. For example, the WTRU may configure the passive receiver for a particular energy signature and expected sequence of thresholding events characteristic for delivery of a ZE system information notification. Next, the WTRU may determine occurrence of an indication event signifying to the WTRU processor that the determined energy signature was detected. Then, upon positive detection, the WTRU with a passive receiver may start the main cellular modem receiver in order to receive and determine in detail any updated system information. In an alternative or additional implementation, the WTRU with a passive receiver may determine contents or signaling representation of the received ZE system notification signaling and then update system information contents from stored information in memory replacing earlier system information contents using the determined signaling representation.

Embodiments for public warning notifications are described herein.

In a first embodiment, the ZE notification signal may correspond to a signaling message indicating, representing or announcing transmission of an emergency or public warning message.

Without loss of generality and for illustration purposes, ZE emergency notifications may be used in conjunction with ETWS, PWS or CMAS. Emergency warnings may be comprised of either a single signaling part or multiple parts, possibly with different lengths and payload contents. For example, a first signaling part of an emergency warning may contain a few bits such as a short code indicating that an emergency warning message is to be transmitted. A second signaling part may contain the actual emergency warning message.

For example, the ZE emergency notification signal processed by the passive receiver may only indicate that an emergency warning is being broadcast. Specifically, a first signaling value may indicate that emergency warning is transmitted. A second signaling value may indicate that no such transmission is occurring. Alternatively or additionally, presence or absence of such a ZE emergency notification signal may imply that an emergency warning is being transmitted or not. First, a WTRU may determine that an emergency warning is transmitted by means of the passive receiver processing an incoming ZE emergency notification signal. Second, the WTRU may determine more details or the actual contents of an indicated emergency message. Either the passive receiver or the main cellular modem may be used by the WTRU to for this determination.

It is noted that the above emergency notifications can be reliably and time-critically delivered to a WTRU using the passive receiver while little if any battery power is consumed by the device, while more detailed emergency warning messages are decoded by the device using the main cellular modem on a per-need basis (i.e. only when required).

Processing of a received ZE emergency notification by the WTRU may be based on the use of known transmission characteristics, signaling indications, multiple transmission instances or a reception schedule such as described earlier.

In a first technical realization, a received ZE emergency notification signal may indicate a type, classification, priority level, criticality or transmission configuration for decoding of other parts of an emergency warning being transmitted. A short code may be used.

For example, a signaling part of a ZE waveform may be used to carry the bit representation. Alternatively or additionally, the received ZE emergency notification may be represented in the form of an index value which is used by the WTRU to look up detailed values corresponding to an emergency warning. This approach may greatly reduce the signaling load of the ZE waveform, therefore extending range, because more time is possible for energy accumulation by the passive receiver.

Information associated with an emergency warning for use with a ZE notification signal by a WTRU equipped with a passive receiver may be pre-configured, known and stored in memory in the WTRU. Alternatively or additionally, this information may be signaled and configurable in the WTRU. For example, network nodes such as MME or eNB may use control signaling in the form of NAS, RRC, MAC CE or L1 signaling using the main cellular modem when active to configure and/or indicate information associated with an emergency warning using a passive receiver by a WTRU.

In one example procedure, first, a WTRU with a passive receiver processing a ZE emergency notification signal may determine one or more transmission characteristic for the signaling waveform. For example, the WTRU may configure the passive receiver for a particular energy signature and expected sequence of thresholding events characteristic for delivery of a ZE emergency notification. Second, the WTRU may determine occurrence of an indication event signifying to the WTRU processor that the determined energy signature was detected. Third, upon positive detection, the WTRU with a passive receiver may start the main cellular modem receiver in order to receive and determine in detail the emergency message. In an alternative or additional implementation, the WTRU with a passive receiver may determine contents or signaling representation of the received ZE emergency notification signal and then retrieve information contents from stored information in memory. The main processor of the device may be started up. A request or flag for issuing audible or visual indication or presence and details of a received ZE emergency notification may be issued by the passive receiver logic and passed to the main device processor.

Embodiments for paging notifications are described herein.

In a first embodiment, the ZE notification signal may correspond to a signaling message indicating, representing or announcing a paging message.

Without loss of generality and for illustration purposes, ZE paging notifications may be used in conjunction with AS and NAS issued paging. Paging notifications may be comprised of either a single signaling part or multiple parts, possibly with different lengths and payload contents. For example, a first signaling part of a paging message may contain a few bits such as a short code indicating that paging message is to be transmitted. A second signaling part may contain the actual paging message, possibly for one or for a group of users, or individual paging messages intended for multiple users conveyed in one signaling message.

For example, the ZE paging notification signal processed by the passive receiver may indicate that a paging message is being broadcast. Specifically, a first signaling value may indicate that a paging message is transmitted. A second signaling value may indicate that no such transmission is occurring. Alternatively or additionally, presence or absence of such a ZE paging notification signal may imply that a paging message is being transmitted or not. First, a WTRU may determine that a paging message is transmitted by means of the passive receiver processing an incoming ZE paging notification signal. Second, the WTRU may determine more details or the actual contents of an indicated paging message. Either the passive receiver or the main cellular modem may be used by the WTRU for this determination.

It is noted that paging messages can be reliably and time-critically delivered to a WTRU using the passive receiver while little if any battery power is consumed by the device, while more detailed paging message contents are decoded by the device using the main cellular modem on a per-need basis (e.g., only when required).

ZE paging notification messages can be transmitted using one or combination of the synchronous or asynchronous transmission options.

In the synchronous transmission, ZE paging notifications may occur according to, among other options, a well-determined cell-specific and/or WTRU specific based schedule.

In asynchronous transmission, ZE paging notifications may occur at any point in time using a well-determined and/or pre-configured transmission format.

Processing of a received ZE paging notification by the WTRU based on a synchronous transmission may require the WTRU to search for paging notifications at specific instances in time according to a reception schedule such as described earlier. For example, the reception schedule may be determined by the WTRU as a function of applicable POs and/or PTWs where it may receive paging signaling. POs and/or PTWs may be determined, among other options, as a function of WTRU, cell or tracking area identifiers and/or timing parameters such as clock and counter values. The considered WTRU identifier can be unique area-independent identifier such as IMSI, tracking area unique identifier such as S-TMSI, an RNA unique identifier, and/or other unique or group identifier(s) that can be specifically defined by the network for the purpose of ZE paging notification reception.

Processing of a received ZE paging notification by the WTRU based on an asynchronous transmission may require the WTRU to keep searching for paging notifications all the time. The WTRU can identify the reception of a paging notification by detecting the use of known transmission characteristics, signaling indications and/or multiple transmission instances such as described earlier. For example, a paging notification may be detected by the WTRU using a specific energy profile or signature such as the number, distribution, separation of thresholding events, and/or the like.

A reception failure of a ZE paging notification destined to a multi-mode WTRU that is equipped with a passive receiver may be detected by the WTRU and/or network using one or a combination of the following options.

First, the WTRU may fail to detect the presence of a paging notification message using a well-determined and/or a set of pre-configured ZE paging notification transmission formats for a specific period of time that can be either determined by the WTRU or signaled by the network to the WTRU.

Second, the WTRU may fail to detect a paging notification message using a well-determined or a configured transmission schedule for a certain number of times or during a specific period of time that can be either determined by the WTRU or signaled by the network to the WTRU.

Third, the WTRU may fail to detect/decode one and/or more than one signaling part(s) in the ZE paging notification signal for a certain number of times or during a specific period of time that can be either determined by the WTRU or signaled by the network to the WTRU.

Fourth, the network may fail to receive a response from the paged WTRU within a pre-defined time window after one or multiple transmissions of the paging notification message.

A network that detects a paging notification reception failure may retransmit the ZE paging notification message using the same or a different transmission format that might or might not require the transmission of a system information change notification. For example, the network may incrementally increase the duration and/or power and/or waveform of the POW part of the ZE signal to allow the WTRU to accumulate more energy before trying to decode the paging notification. Alternatively or additionally, the network may decide, among other transmission format configuration discussed earlier, to repeat the signaling part of the ZE signal one or more times to increase the WTRU's detection/decoding probability of success.

On the other hand, a WTRU that detects a paging notification reception failure and has not recently detected a system information modification notification that might be related to ZE paging notification transmission format and/or schedule, or a change in the tracking area identifier, can initiate a paging failure fallback procedure. In this procedure, the WTRU can wake-up the main cellular modem and acquire system information to detect any changes to the current ZE paging notification configuration. If the WTRU detects a change in the configuration, it may update the system information and resume passive receiver operation Otherwise the WTRU may decide to continue in RRC_IDLE using the main cellular modem.

In a first technical realization, a received ZE paging notification signal may indicate a type, classification, priority level, criticality or transmission configuration for decoding of other parts of a paging message being transmitted. A short code may be used.

For example, a signaling part of a ZE waveform may be used to carry the bit representation. Alternatively or additionally, the received ZE paging notification may be represented in the form of an index value which is used by the WTRU to look up detailed values corresponding to a paging message. This approach may greatly reduce the signaling load of the ZE waveform, therefore extending range, because more time is possible for energy accumulation by the passive receiver.

Information associated with a paging message for use with a ZE notification signal by a WTRU equipped with a passive receiver may be pre-configured, known and stored in memory in the WTRU. Alternatively or additionally, this information may be signaled and configurable in the WTRU. For example, network nodes such as MME or eNB may use control signaling in the form of NAS, RRC, MAC CE or L1 signaling using the main cellular modem when active to configure and/or indicate information associated with a paging message using a passive receiver by a WTRU.

In one example procedure, first, a WTRU with a passive receiver processing a ZE paging notification signal may determine one or more transmission characteristic for the signaling waveform. For example, the WTRU may configure the passive receiver for a particular energy signature and expected sequence of thresholding events characteristic for delivery of a ZE paging notification. Second, the WTRU may determine occurrence of an indication event signifying to the WTRU processor that the determined energy signature was detected. Third, upon positive detection, the WTRU with a passive receiver may start the main cellular modem receiver in order to receive and determine in detail the paging message. In an alternative or additional implementation, the WTRU with a passive receiver may determine contents or signaling representation of the received ZE paging notification signal and then retrieve information contents from stored information in memory.

Embodiments for system information are described herein.

In a first embodiment, a WTRU with a passive receiver may determine a configuration associated with reception or transmission parameters for use of the main cellular modem by processing a ZE signaling waveform.

A configuration for use of reception or transmission with the main cellular modem and determined by the WTRU using the passive receiver processing a ZE system info notification may be associated with either one or a combination of the following parameters. Examples of time-domain characteristics include, but are not limited to: (1) cell (re-)selection parameters, such as critical Rx signal levels, threshold, offset, hysteresis value(s), neighbor cells, PLMN or frequency channel priority levels to evaluate or compare one or more cells on the same or across different RATs including the passive receiver by means of cell (re-)selection criteria; (2) location area update parameters, cell or group of cells identifiers, such as tracking, location, routing or area identifiers or short codes representing these, timer or delay or conditional values for transmitting location update messages; (3) UL connection establishment parameters, such as random access channel preambles, time/frequency resources, transmission settings like Tx power, Tx power steps, number of repetitions for a step, candidate transmission formats, repetition or time-out timers for random access, time duration or counters or allowed off-channel periods or time-to-reconnect, signaling flags controlling WTRU network connection (re-)establishment behavior; (4) area information, such as RATs which are available or allowable in the cell or group of cells area for which the passive receiver coverage is provided, the frequency, channel or operating band information associated with these; (5) PLMN or list of PLMNs or equivalent PLMNs; and (6) cells barred, or cells reserved, or cells restricted for operator use, unified access control with access restrictions.

Processing of a received ZE system info notification by the WTRU may be based on the use of known transmission characteristics, signaling indications, multiple transmission instances or a reception schedule such as described earlier.

For example, a WTRU may continuously use its passive receiver while the main cellular modem is switched off. While processing incoming ZE radio signaling at a low data rate according to the rate at which the WTRU can harvest and accumulate energy from the POW parts in the ZE signaling waveform(s), the WTRU may determine which RATs, PLMN/equivalent PLMN, access restrictions and operating bands are available in the geographic area. Alternatively or additionally, the WTRU may determine how often it should re-connect to the cellular network using the main cellular modem. Alternatively or additionally, a WTRU may determine if in the coverage area, the use of a passive receiver is enabled, preferred or left for choice by the WTRU implementation.

For example, a signaling part of a ZE system info notification may be used to carry a bit representation. Alternatively or additionally, the received ZE system info notification may be represented in the form of an index value which is used by the WTRU to look up detailed values corresponding to a system info message. This approach may greatly reduce the signaling load of the ZE waveform, therefore extending range, because more time is possible for energy accumulation by the passive receiver.

Information associated with a system info message for use with a ZE notification signal by a WTRU equipped with a passive receiver may be pre-configured, known and stored in memory in the WTRU. Alternatively or additionally, this information may be signaled and configurable in the WTRU. For example, network nodes such as MME or eNB may use control signaling in the form of NAS, RRC, MAC CE or L1 signaling using the main cellular modem when active to configure and/or indicate information associated with a system info message using a passive receiver by a WTRU.

In an example procedure, first, a WTRU with a passive receiver processing a ZE system info notification signal may determine one or more transmission characteristics for the signaling waveform. For example, the WTRU may configure the passive receiver for a particular energy signature and expected sequence of thresholding events characteristic for delivery of a ZE system info notification. Second, the WTRU may determine occurrence of an indication event signifying to the WTRU processor that the determined energy signature was detected. Third, the WTRU with a passive receiver may determine contents or signaling representation of the received ZE system info notification signal and then retrieve information contents from stored information in memory. Fourth, the WTRU processor may deliver the updated system info to a memory available to the main cellular modem. For example, the updated serving cell info like cell identifier, frequency channel and UL random access parameters of an LTE network layer valid for the area in which coverage is provided through the passive receiver is made available to memory where the main cellular modem, upon start up, can use this information to speed up initial connection establishment and reduce power consumption while using the main cellular modem (FIG. 9).

Figure 9:
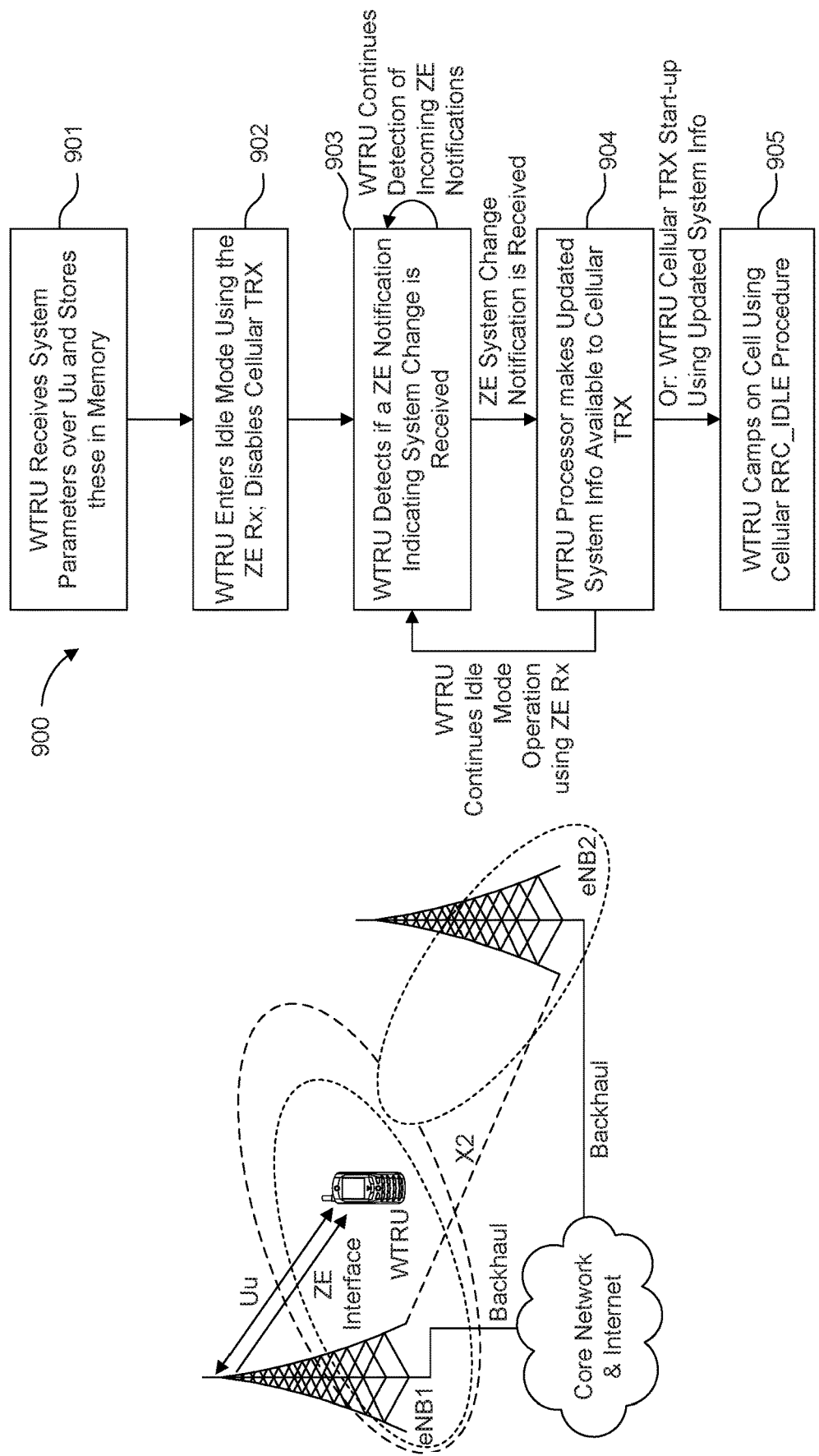
FIG. 9 is an example WTRU-autonomous system information update procedure using a passive receiver.

In an embodiment, as shown in FIG. 9, a method 900 for updating system information may comprise: at 901, receiving system parameters over Uu air interface and storing the system parameters in a memory; at 902, entering idle mode using the ZE Rx, and disabling Cellular TRX; at 903, detecting if a ZE notification indicating system change is received, wherein if a ZE notification is received, at 904, making updated system information available to Cellular TRX or starting up Cellular TRX using updated system information; at 905, camping on Cell using Cellular RRC_IDLE procedure.

A multi-mode WTRU equipped with a passive receiver may receive and process a system information change associated with one or more of the cell (re-) selection parameters pertaining to some or all the evaluation criteria and how the passive and/or the main cellular modem measurement acquisition is performed. The WTRU may then deliver the updated system information to a memory available to the passive and/or the main cellular modem. For example, the change in cell (re-) selection parameters may require the WTRU to wake-up the main cellular modem to perform new intra-frequency, inter-frequency, and/or inter-RAT measurements, considering existing and/or updated priority levels, and according to regular or relaxed monitoring criteria. Alternatively or additionally, the WTRU may be required to wake-up the main cellular modem and consider some or all the already available passive receiver measurements along with existing and/or updated priority levels to evaluate/compare the serving and/or neighbor cells for intra-frequency, inter-frequency, and/or inter-RAT cell (re-) selection purposes. Alternatively or additionally, for the WTRU might be to simply resume the passive receiver operations.

It is noted that the use of a passive receiver by the WTRU and the benefits it entails, little or no power consumption in RRC_IDLE, can be advantageously combined with the use of a cellular modem to speed up start-up time and reduce battery consumption.

A method for updating system information by a WTRU according to this application is generally described as follows. First, the WTRU equipped with a passive receiver receives system information for one or more cells associated with one or more ZE mobility areas when active over the Uu air interface using common or dedicated signaling. Next, the WTRU may store the received system information in a memory shared between the active and passive receivers and identify a system information set associated with a current serving cell. Then, the WTRU may maintain a valid system information set as the WTRU moves between ZE cell areas using parameters, such as ZE cell area identifiers and ZE mobility area identifiers, received over the ZE air interface.

Figure 10A:
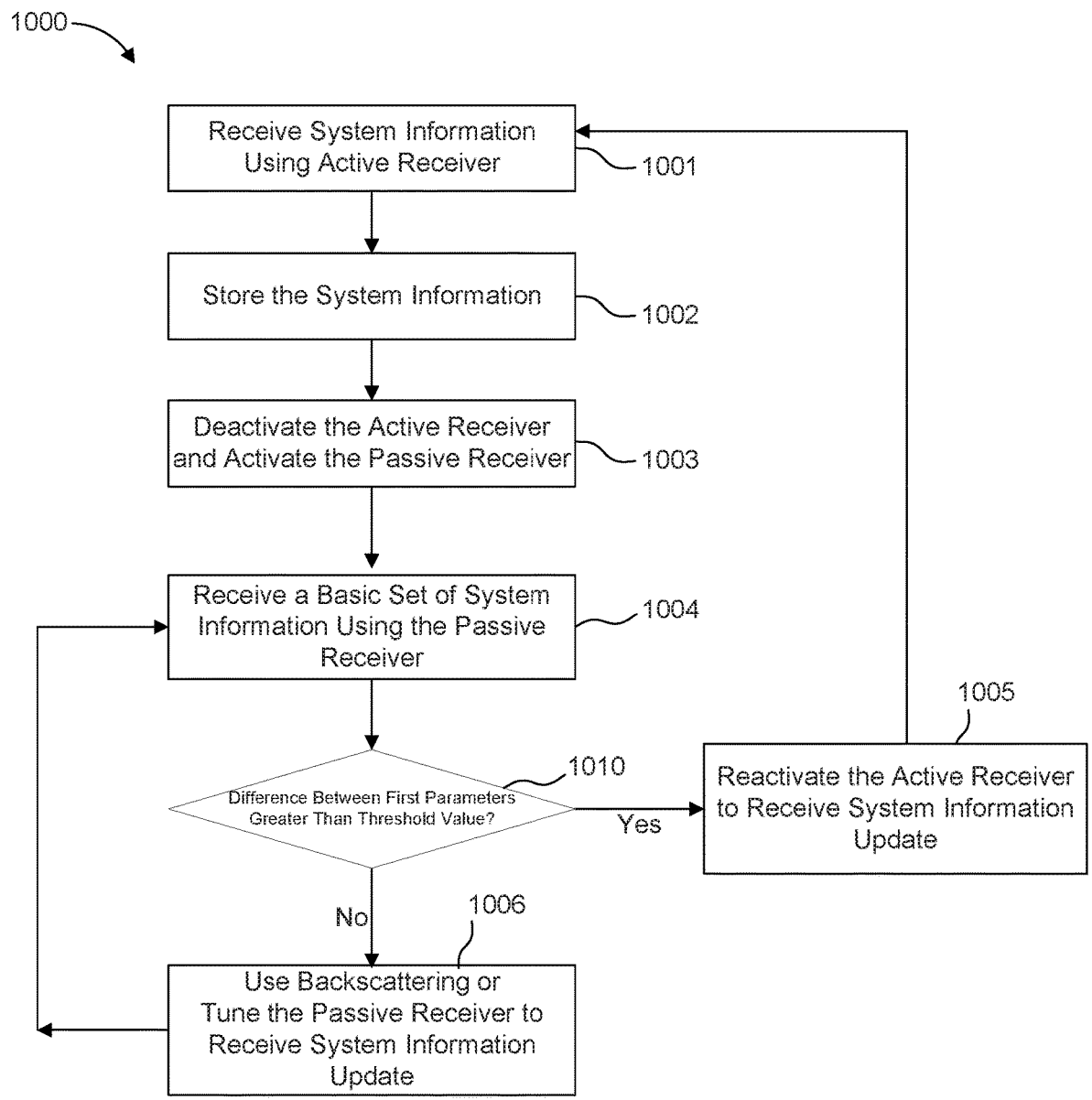
FIG. 10A is a diagram illustrating a method for updating system information according to an embodiment of this application.
Figure 10B:
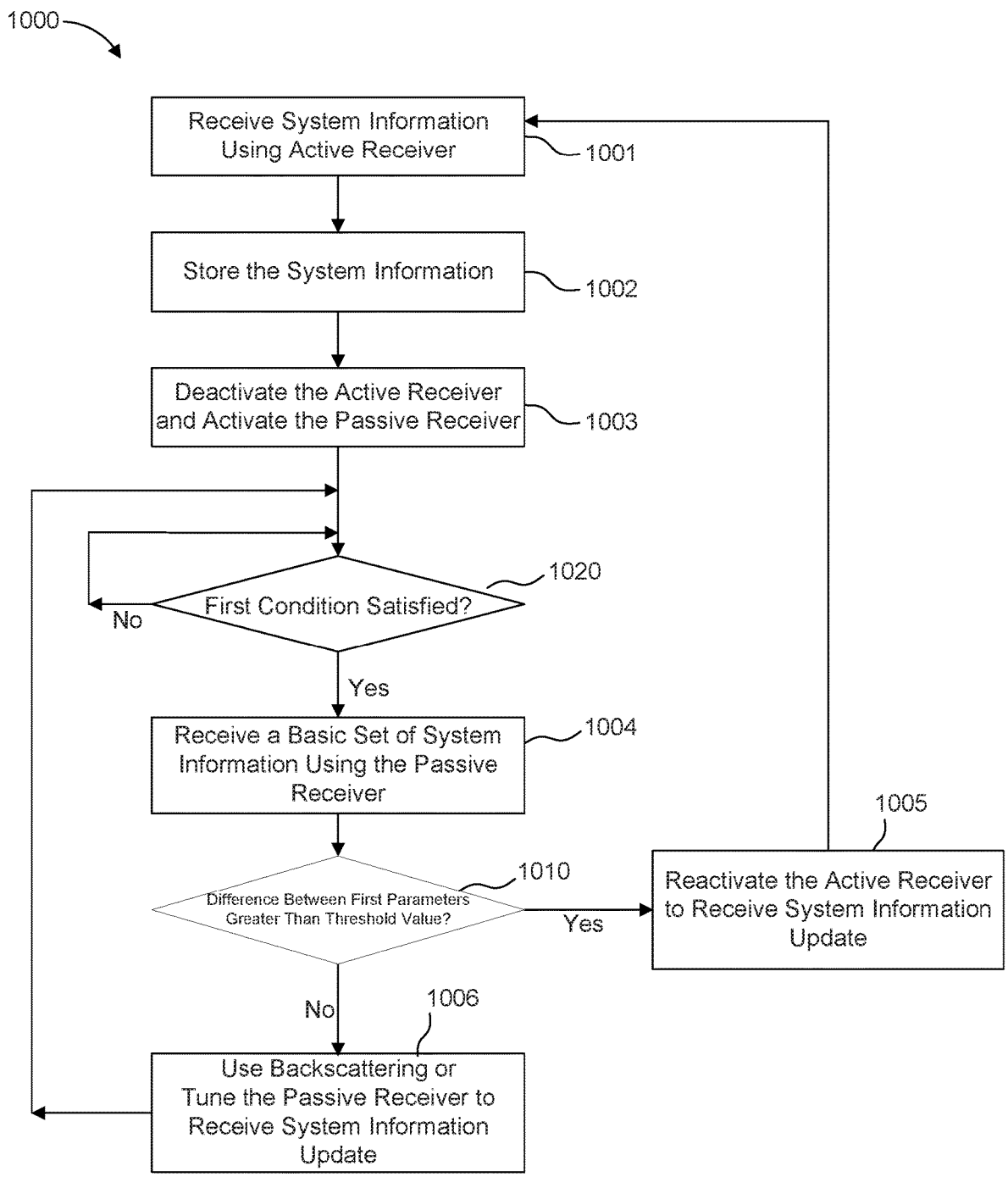
FIG. 10B is a diagram illustrating a method for updating system information according to an embodiment of this application.

A method 1000 for updating system information by a WTRU with a passive receiver and an active receiver will be described in detail as follows with reference to FIGS. 10A-10B. FIG. 10A is a flow chart illustrating a method for updating system information according to an embodiment of this application. FIG. 10B is a flow chart illustrating a method for updating system information according to another embodiment of this application. It should be noted that FIGS. 10A-10B only illustrate two preferable embodiments of the method for updating system information according to this application, and other preferable embodiments will be illustrated and described with reference to FIGS. 11A-11B below. In order to make a full and clear description of this application and for a purpose of making a comparison of different embodiments, some features regarding to those embodiments shown in FIGS. 11A-11B will be discussed when describing the embodiments shown in FIGS. 10A-10B.

As shown in FIG. 10A, the method 1000 comprises: at 1001, receiving, using an active receiver, system information comprising a first system information set, wherein the first system information set is currently valid for the WTRU; at 1002, storing the system information; at 1003, deactivating the active receiver and activating a passive receiver; and at 1004, receiving a basic set of system information (BSSI) using the passive receiver; at 1010, determining whether a difference between a first parameter in the BSSI and a first parameter in the first system information set is greater than a threshold value, wherein on a condition that the difference is greater than the threshold value, at 1005, reactivating the active receiver to receive a second system information set as a currently valid system information set for the WTRU; and on a condition that the difference is not greater than the threshold value, at 1006, using backscattering to request a third system information set or tuning the passive receiver to receive the third system information set as the currently valid system information set for the WTRU.

Accordingly, the WTRU according to this application may comprise: an active receiver configured to receive system information comprising a first system information set, wherein the first system information set is currently valid for the WTRU; a memory configured to store the system information; a passive receiver configured to receive a basic set of system information (BSSI); a processor configured to deactivate the active receiver and activate the passive receiver after the active receiver received the system information, and configured to determine whether a difference between a first parameter in the BSSI and a first parameter in the first system information set is greater than a threshold value, wherein on a condition that the difference is greater than the threshold value, the processor is further configured to reactivate the active receiver to receive a second system information set as a currently valid system information set for the WTRU; and on a condition that the difference is not greater than the threshold value, the processor is further configured to use backscattering to request a third system information set or tune the passive receiver to receive the third system information set as the currently valid system information set for the WTRU.

The passive receiver is the same as or similar to those passive receivers described above with reference to FIGS. 2-8. The active receiver is the same as or similar to the active receiver described above with reference to FIGS. 2-8.

The processes from 1001 to 1006 will be described in detail as follows.

As shown in FIG. 10A, the method 1000 may comprise: at 1001, receiving, using an active receiver, system information comprising a first system information set, wherein the first system information set is currently valid for the WTRU. That is, the WTRU comprises an active receiver which may be configured to receive system information comprising a first system information set, wherein the first system information set is currently valid for the WTRU.

The system information may comprise one or more system information sets, such as the first system information set and other system information sets as described below. It should be noted that in the embodiments shown in FIGS. 10A-10B, the system information may comprise only one system information set, i.e., the first system information set, and in the embodiments shown in FIGS. 11A-11B, the system information may comprise multiple system information sets, e.g., the first system information set and the fourth system information set as described below.

Each system information set may comprise one or combination of the following information elements to support the main and/or passive receiver operations/procedures in idle/inactive state: cell access evaluation criteria/parameters and broadcast system information scheduling parameters over the Uu air interface; cell access evaluation criteria/parameters and/or broadcast system information scheduling parameters over the ZE air interface; cell reselection thresholds, hysteresis, priorities, and other (i.e. mobility) parameters that are common to intra-frequency, inter-frequency, and/or inter-RAT reselection over Uu air interface; cell reselection thresholds, hysteresis, priorities, and other (i.e. mobility) parameters that are common to intra-frequency, inter-frequency, and/or inter-RAT reselection over ZE air interface; neighboring cell(s)-specific offset parameters, physical cell identity(-ies), and frequency carrier(s)/band(s) parameters/list relevant to intra-cell and/or inter-cell and/or inter-RAT reselection over the Uu air interface; neighboring cell(s)-specific offset parameters, ZE cell identity(-ies), and ZE-mobility area identity(-ies) relevant to intra-cell and/or inter-cell reselection over the ZE air interface; mapping between the neighboring cell(s) ZE cell identity(-ies) and ZE-mobility area identity(-ies) to physical cell identity(-ies); ZE cell identities and ZE-mobility area identities mapping ambiguity resolution parameters; and/or a version identifier of system information.

It should be noted that the above information elements are not intended to be exclusive or be limiting to the present application. The system information received at 1001 and to be updated in the following processes may also comprise other information elements as long as they may help to realize the principle of this application.

It should also be noted that the system information may be transmitted and stored in a form of data, frame, value, etc. This application will not set a limit to the form of the system information. One of the most important functions of the system information is to transmit parameter message or configuration message which may be applied by the WTRU. Therefore, in this application, unless otherwise indicated, the terms "system information", "system information message" and "system information set(s)" may be used interchangeably.

A system information set may be a unit within the system information, and it may be corresponding to a cell within a mobility area. The system information may comprise one or more such system information sets which accordingly may be corresponding to one or more cells within one or more mobility areas. For example, the system information comprises a system information set A, a system information set B and a system information set C. The system information set A is corresponding to a cell #1 within a mobility area #1; the system information set B is corresponding to a cell #2 within the mobility area #1; and the system information set C is corresponding to a cell #1 within a mobility area #2.

Although the system information may comprise multiple system information sets, one of the system information sets is a currently valid system information set for the WTRU. That is, one of the cells to which a system information set is corresponding to a currently serving cell which is providing service to the WTRU or where the WTRU is located. Typically, there will be only one serving cell. Continue with the example in the above paragraph, let's assume that the WTRU is currently located at the cell #1 within the mobility area #1 such that it is the current serving cell. The system information set A is the currently valid system information set. Then, the WTRU moves to the cell #2 within the same mobility area, and thus the cell #2 becomes the serving cell. Accordingly, the system information set B becomes the currently valid system information set. Even though the WTRU keeps staying in the same cell, the currently valid system information set might be outdated and thus needs to update under some circumstances. One of the purposes of this application is to ensure the WTRU to possess a correctly valid version of system information set as needed.

It should be noted that the term "version" here is intended to differentiate between "an outdated system information set" and "an updated system information set." As described above, an updated system information set may be a new system information set corresponding to a new serving cell, or an updated system information set corresponding to the same serving cell. The description below will further describe the valid version of system information set with reference to detailed embodiments and the processes at 1005 and 1006 as well.

The first system information set represents the currently valid system information set (i.e., the currently valid version of system information set) at 1001. If the system information received at 1001 has only one system information set as shown in FIGS. 10A-10B, it should be the first system information set. If the system information received at 1001 has multiple system information sets as shown in FIGS. 10A-10B, one of them is the first system information set. The first system information may comprise different elements as discussed above.

It will be appreciated that the term "first system information set" is intended to differentiate it from other system information sets which may be received by the WTRU in the following processes. Therefore, the term "first" here is not intended to be limiting to the content of the system information set to be received at 1001.

The method 1000 may comprise: at 1002, storing the system information. That is, the memory is configured to store the system information.

In an embodiment, the WTRU may store the received system information in a memory shared between the active receiver and the passive receiver. Those information elements in a system information set may be used by both the active receiver and the passive receiver in order to update the system information received at 1001. As discussed in the above example of three system information sets, the system information set B will become valid for the WTRU if the WTRU moves to the cell #2 within in the mobility area #1. In that case, the system information set B may be accessed by the active receiver and/or the passive receiver for IDLE state operations or procedures, e.g., cell reselection procedure.

In an embodiment, the WTRU may store the received system information in a memory only available for either the passive receiver or the active receiver. For example, if the WTRU is used in a scenario where a system information update for current serving cells is typically not periodically broadcast over the ZE air interface and backscattering-based system information request is not supported, then the system information may be stored in a memory only available for the active receiver because the active receiver should be activated every time when trying to update the system information and thus there is no need for the passive receiver to access the stored system information. Therefore, the system information received at 1001 may be stored in a memory only available for the active receiver.

In an embodiment, only a part of the system information received at 1001 may be stored. That is, only some of the system information sets received at 1001 may be stored in a memory. In the embodiments shown in FIGS. 10A-10B, there is only one system information set (i.e., the first system information set) received and thus the first system information set will be stored at 1002. In the embodiments shown in FIGS. 11A-11B, as discussed in the above example of three system information sets, the WTRU may determine that it only has sufficient shared memory to store a part of the received system information and it decides to store system information sets A and B associated with the cells #1 and #2 in the mobility area #1. The decision to determine which system information sets to store might be based on random selection or historical data with or without the serving cell/network assistance.

Although the above description described different embodiments of storing the system information, those embodiments are given for exemplary purpose and are not intended to be exclusive or be limiting to the present application. The system information received at 1001 may be stored in any other ways as long as they would be helpful to realize the principle of the method 1000 according to this application.

The method 1000 may further comprise: at 1003, deactivating the active receiver and activating a passive receiver. Accordingly, the WTRU according to this application may be configured to deactivate the active receiver and activate a passive receiver.

As discussed above, the active receiver is working at an active mode at 1001 in order to receive the system information. Then, after receiving the system information, the WTRU needs to shift into an idle mode in order to save energy. In the idle mode, the active receiver needs to be in a non-active mode, and the passive receiver needs to be in an active mode. In other words, the WTRU needs to deactivate the active receiver. Meanwhile, the passive receiver needs to be activated in order to detect and receive BSSI.

In an embodiment, deactivating the active receiver and activating the passive receiver may happen simultaneously. In another embodiment, deactivating the active receiver and activating the passive receiver may happen in sequence. For example, the WTRU may deactivate the active receiver first, and then activate the passive receiver. Sometimes, the WTRU might move into another cell in a second. Therefore, a time difference between the deactivation process and the activation process should be substantially short so that the passive receiver may be activated to detect and receive BSSI in time.

Although the above embodiment illustrated the sequence of the deactivation process and the activation process, they are not intended to be exclusive or be limiting to the method 1000. It will be appreciated that although in the above embodiments, the deactivation process and the activation process at 1003 were illustrated after the process at 1002, those embodiments are not intended to be exclusive or be limiting to the method 1000. The deactivation process and the activation process may happen after the process at 1001 and before the process at 1002.

After the process at 1003, the method 1000 may proceed to the process at 1020 in the embodiment shown in FIG. 10B, and further if the first condition is satisfied at 1020, then the method 1000 may proceed to the process at 1004. It should be noted that there is no process at 1020 in the embodiment shown in FIG. 10A. That's to say, as shown in FIG. 10A, after the process at 1003, the method 1000 may proceed to the process at 1004. In other words, one of the differences between the two embodiments respectively shown in FIGS. 10A-10B is that the embodiment shown in FIG. 10B comprises the process at 1020 between the process at 1003 and the process at 1004. The following description will first discuss the process at 1020 first, then will continue to discuss the process at 1004 which is commonly comprised in these two embodiments.

The method 1000 may comprise: at 1020, determining whether a first condition is satisfied, wherein on a condition that the first condition is satisfied, receiving the basic set of system information (BSSI) using the passive receiver. Accordingly, the processor may be configured to determine whether a first condition is satisfied, wherein on a condition that the first condition is satisfied, the passive receiver may be further configured to receive the basic set of system information (BSSI).

In an embodiment, the first condition may be that the passive receiver receives a system information change notification. The system information change notification may be received as a form of data, signal, frame, etc. The system information change notification may also be referred to as system change notification, system change notification signal, or ZE system change notification.

The system information change notification may indicate whether system information has changed or not through different ways. For example, the system information change notification may comprise two signaling values: a first signaling value indicating that system information has changed; and a second signaling value indicating that no such change occurred. The system information change notification itself may also imply that a change occurred. That is, if the passive receiver receives a system information change notification, the WTRU may determine that system information has changed.

As discussed above, the system information may comprise multiple system information sets. In that case, the system information change notification may also indicate whether there is a change to all of the system information sets or just to one or some of the system information sets. For example, the system information change notification may indicate directly in its bit representation which set or sets of the received system information will be changed. For another example, the system information change notification may have an index value which may be used by the WTRU to look up detailed values corresponding to the information about which set or sets of system information will be changed. The above two examples show two approaches which may greatly reduce the signaling load of the ZE waveform for the system information change notification, therefore extending range because more time is possible for energy accumulation by the passive receiver.

The passive receiver may receive the system information change notification based on known transmission characteristics, signaling indications, multiple transmission instances or a reception schedule such as described earlier.

It will be appreciated that the above embodiment of the system information change notification is described by way of example, and it is not intended to be exclusive or be limiting to the present application.

In an embodiment, the first condition may be that the passive receiver receives a public warning notification. The public warning notification may be received as a form of data, signal, frame, etc. The public warning notification may also be referred to as public warning system notification, public warning notification signal, public warning message or emergency warning message.

The public warning notification may indicate whether a public warning is broadcast through different ways. For example, the public warning notification may be comprised of the following two signaling parts: a first signaling part of the public warning notification indicating that a public warning is to be transmitted; and a second signaling part of the public warning notification containing the actual emergency warning message. For another example, the public warning notification may comprise the following two values: a first signaling value indicating that a public warning is transmitted; and a second signaling value indicating that no such transmission is occurring.

The passive receiver may receive the public warning notification based on known transmission characteristics, signaling indications, multiple transmission instances or a reception schedule such as described earlier.

It will be appreciated that the above embodiment of the public warning notification is described by way of example, and it is not intended to be exclusive or be limiting to the present application. In an embodiment, the first condition may be that the WTRU detects a change in a serving cell.

For example, as discussed in the above example of three system information sets, if the WTRU moves to the cell #2 within in the mobility area #1 from the cell #1 within in the mobility area #1, then the cell #2 will become a new serving cell. At this time, the WTRU may detect a change in a serving cell, i.e., a change from the cell #1 to the cell #2. Then, the processor may determine that the first condition is satisfied at 1020.

It will be appreciated that the above example is described only by way of example, and it is not intended to be exclusive or be limiting to the present application. The WTRU may use any available method to detect a serving cell's change as long as that method can help to realize the present application.

In an embodiment, the first condition may be that the WTRU initiates a cell reselection procedure.

For example, the WTRU may perform received signal strength measurements on a current serving cell and/or neighbor cells. If the WTRU finds a more suitable cell according to a cell reselection criteria, it reselects onto that cell as a new serving cell and camps on it. It will be appreciated that this example of cell reselection procedure is given by way of example, and it is not intended to be exclusive or be limiting to the present application.

It can be seen that a cell reselection procedure is related to a change of serving cell. Typically, if the WTRU detects a change of serving cell, it will perform a cell reselection procedure. Therefore, in an embodiment, the first condition at 1020 may be that the WTRU detects a change in a serving cell and thus initiates a cell reselection procedure. That is, the first condition may comprise the following two sub-conditions: (1) changing serving cell and (2) initiating a cell reselection procedure.

Although the above embodiments illustrate some exemplary first conditions at 1020, it will be appreciated that those embodiments are not intended to be exclusive or be limiting to the first condition which may be applied in this application. The method for updating system information according to this application may select any condition which may be helpful to realize the process at 1020.

As shown in FIG. 10A, the method 1000 may further comprise: at 1004, receiving a BSSI using the passive receiver. Accordingly, the passive receiver may be further configured to receive a BSSI.

The WTRU may be required to periodically acquire a BSSI to ensure the possession of valid version of system information set as discussed above with reference to the description of the system information received at 1001. The passive receiver can acquire a BSSI by monitoring preconfigured scheduled transmission instances or specific transmission characteristics as described above. The passive receiver may also need to acquire a BSSI if the first condition has been satisfied at 1004. For example, the passive receiver may need to acquire the BSSI in idle/inactive state upon: cell re-selection (i.e. detection of a change of the current serving cell); reception of a system information change notification as described above; and/or reception of a public warning notification.

It will be appreciate that the above two embodiments about how to determine the WTRU has a valid version of system information set are given in a way of example and they are not intended to be exclusive or be limiting to the present application.

The BSSI may comprise a first parameter. In a first embodiment, the first parameter may comprise a system information version identifier. In a second embodiment, the first parameter may comprise a ZE cell identifier. In a third embodiment, the first parameter may comprise a ZE mobility area identifier. In a fourth embodiment, the first parameter may comprise a public land mobile network (PLMN) identity.

It should be noted that the above three embodiments about the first parameter are only give by way of example, and they are not intended to be exclusive or be limiting to the content of the first parameter. The first parameter may comprise any element that may help to realize the principle of this application. For example, the first parameter may comprise at least one of a ZE cell identifier, a ZE mobility area identifier, a system information version identifier, or a PLMN identity.

The BSSI may further comprise a second parameter. The second parameter may comprise at least one of a transmission period, a reference time, a transmission order or transmission characteristics.

The BSSI may further comprise information on whether other system information sets are periodically transmitted in the current cell or not, and transmission parameters of other syste informatoin sets, if applicable, of each system information set.

Those transmission parameters in the BSSI can be defined/identified, for example, as one or more of the following: (1) a transmission period $T_p$ where all system information sets are transmitted; (2) a reference time defining the beginning of a first system information set transmission, for example, an offset $\Delta T_r$ after the detection of a preamble with a preconfigured characteristic or a frame number $N_f$ satisfying a relationship $N_f \mod N_p = 0$ where $N_p$ is the number of frames corresponding to a transmission period; (3) a transmission order of system information sets and corresponding transmission duration, for example, set 2 for duration $T_2$ followed by set 3 for duration $T_4$, . . . etc; and/or (4) transmission characteristics such as modulation, waveform, transmission rate, transmission repeatitions, and SI sets multiplexing (time/frequency), for example, SI sets transmissions can be multiplexed in frequency by transmitting different sets in different sub-bands simultaneously and depending on WTRUs' passive receiver capability, multiple SI sets may be concurrently decoded.

Although the above embodiments illustrate some exemplary parameters in the BSSI, it will be appreciated that those parameters are not intended to be exclusive or be limiting to the content of the BSSI which may be applied in this application. The BSSI may comprise any parameters which may be helpful to realize the method 1000 according to this application.

Those parameters (e.g., the first parameter and the secondparameter) in the BSSI are important to implement the method 1000. For example, those parameters in the BSSI may be used to determine whether the WTRU has a currently valid version of system information set. In an embodiment, the WTRU may determine that it has a valid version of system information set if the WTRU has been less than some preconfigured (R) minutes/hours since the stored system information sets have been last verified. In another embodiment, the WTRU may determine that it has a valid version of system information set if one or more of the following parameters' values, detected in the BSSI, matches the one of the stored system information sets: (1) an area identifier that marks/identifies BSs/cells that are part of a specific area deployment and/or have the same SI configurations; (2) a cell identifier that differentiate between different/incremental changes in system information among cells within a specific area; (3) a system information version identifier that marks/identifies the latest version considered by a BS/cell within a specified area; and (4) a PLMN identity ensuring that the WTRU is acquiring the desired/registered network's configured system information/parameters. The following descrption will further describe how to use those parameters mentioned above to implement the method 1000.

As shown in FIG. 10A, the method 1000 may further comprise: at 1010, determining whether a difference between the first parameter in the BSSI and a first parameter in the first system information set is greater than a threshold value, wherein on a condition that the difference is greater than the threshold value, at 1005, reactivating the active receiver to receive a second system information set as a currently valid system information set for the WTRU; and on a condition that the difference is not greater than the threshold value, at 1006, using backscattering to request a third system information set or tuning the passive receiver to receive the third system information set as the currently valid system information set for the WTRU.

As discussed, the BSSI may comprise the first parameter. Correspondingly, the first system information set received at 1001 may also comprise a first parameter. That is, the first parameter in the first system information set is corresponding to the first parameter in the BSSI. For example, in an embodiment, the first parameter in the BSSI comprises a system information version identifier, and the first parameter in the first system information set also comprises a system information version identifier. In another embodiment, the first parameter in the BSSI comprises a ZE cell identifier, and the first parameter in the first system information set also comprises a ZE cell identifier.

In an embodiment, the system information version identifier may be used for determining how to update the stored system information. For example, at 1010, the processor may calculate the difference between the system information version identifier in the BSSI and the system information version identifier in the first system information set. Different calculation results will lead the method 1000 to different approaches to update the system information. For example, if the difference obtained at 1010 is greater than a threshold value (e.g., 10), then the method 1000 will go to the process at 1005. If the difference is less than or equal to the threshold value, then the method 1000 will go to the process at 1006.

In an embodiment, the ZE cell identifier may be used for determining how to update the stored system information. For example, at 1010, the processor may calculate the difference between the ZE cell identifier in the BSSI and the ZE cell identifier in the first system information set. Different calculation results will lead the method 1000 to different approaches to update the system information. For example, if the difference obtained at 1010 is greater than a threshold value (e.g., 10), then the method 1000 will go to the process at 1005. If the difference is less than or equal to the threshold value, then the method 1000 will go to the process at 1006.

It will be appreciated that the above-mentioned examples of determining how to update the system information at 1010 are given by way of example, and they are not intended to be exclusive or be limiting to the present application. The following embodiments will illustrate the processes at 1005 and 1006 in detail.

As shown in FIG. 10A, the system information stored at 1002 may be updated through two different approaches. The first approach may be reactivating the active receiver to receive a system information update. For the first approach, the method 1000 may further comprise: at 1005, reactivating the active receiver to receive a second system information set as the currently valid system information set for the WTRU. Accordingly, the WTRU according to this application may be further configured to activate the active receiver to receive a second system information set as the currently valid system information set for the WTRU.

The second system information set may comprise same kinds of information elements as those in the first system information set. For example, the second system information may comprise: a first parameter comprising a system information set identifier, cell access evaluation criteria/parameters, cell reselection thresholds, etc. As discussed in the above example of three system information sets, if the WTRU moves from the cell #1 in the mobility area #1 to the cell #2 within in the mobility area, then the WTRU may receive, using the active receiver, the system information set B (i.e., the second system information set received at 1005) as the currently valid system information set. Therefore, the stored system information has been updated.

After the process at 1005, the WTRU may use the second system information set as the currently valid system information set for the WTRU, and meanwhile stop using the first system information set as the currently valid system information set for the WTRU. The WTRU may store the second system information set into the memory. It should be noted that although the WTRU may stop using the first system information set as the currently valid system information set for the WTRU, some parameters or elements in the first system information set may still be used. For example, if the WTRU moved from ZE cell #1 in mobility area #1 to ZE cell #2 in mobility area #1, the the first system information set and the second system information set may share the same ZE mobility area identifier identifying mobility area #1. In that case, the WTRU may still use the ZE mobility area identifier from the first system information set. In other words, the WTRU does not necessarily replace the first system information set by using the update system information set (e.g., the second system information set). The above mentioned principle can still be applied to other update system information sets, such as the third system information set and the four system information set.

It will be appreciated that the above second system information set is given by way of example and it is not intended to be exclusive or be limiting to the present application. The second system information set may be any available system information set received by the active receiver at 1005 as long as it may help to realize the principle of the present application.

The second approach may be using backscattering to request a system information update (i.e., a third system information set) or tuning the passive receiver to receive the system information update. The second approach is corresponding to the process at 1006. For the second approach, the method 1000 may further comprise: at 1006, using backscattering to request a third system information set or tuning the passive receiver to receive the third system information set as a currently valid system information set for the WTRU. Accordingly, the processor may be further configured to using backscattering to request a third system information set or tuning the passive receiver to receive the third system information set as a currently valid system information set for the WTRU.

The third system information set may comprise the same kinds of information elements as those in the first system information set. For example, the third system information may comprise: a first parameter comprising a system information set identifier, cell access evaluation criteria/parameters, cell reselection thresholds, etc. In an embodiment, if the WTRU determines to use the second approach to update the stored system information, it may use backscattering technology to, for example, reflect waveforms or signals back to a base station which transmitted the BSSI in order to request a system information update. In another embodiment, the WTRU may tune the passive receiver based on those parameters in the BSSI (e.g., transmission characteristics) in order to receive a system information update.

The WTRU interested in the reception of specific system information sets (e.g., the third system information set) may request their transmission from the serving cell as a response to a system information request poll initiated by that cell followed by a backscattering reception period that is pre-configured or configured by the network. The system information request poll may be transmitted by each cell on a periodic basis, and may optionally be followed by a detection period used by the WTRU under the cell coverage to declare an interest in system information transmission. The detection period may then be followed by the backscattering reception period based on whether the WTRU has been detected or not. The WTRU utilizing the passive receiver for system information acquisition may use backscattering to request any essential system information sets, for example, if it moved to the current cell from another cell in idle/inactive state; and/or if it determined after decoding the BSSI that some of the required system information sets are not valid and are not transmitted periodically under the current serving cell.

It will be appreciated that the above third system information set as well as its reception method is given by way of example and it is not intended to be exclusive or be limiting to the present application. The third system information set may be received by the passive receiver at 1006 through any available method as long as it can help to realize the principle of this application.

The embodiment shown in FIG. 10B comprises all of the processes discussed above with reference to FIG. 10A. Further, the embodiment shown in FIG. 10B further comprises the process at 1020. The above description has already described the process at 1020. Therefore, this application will skip description of those processes shown in FIG. 10B.

Figure 11A:
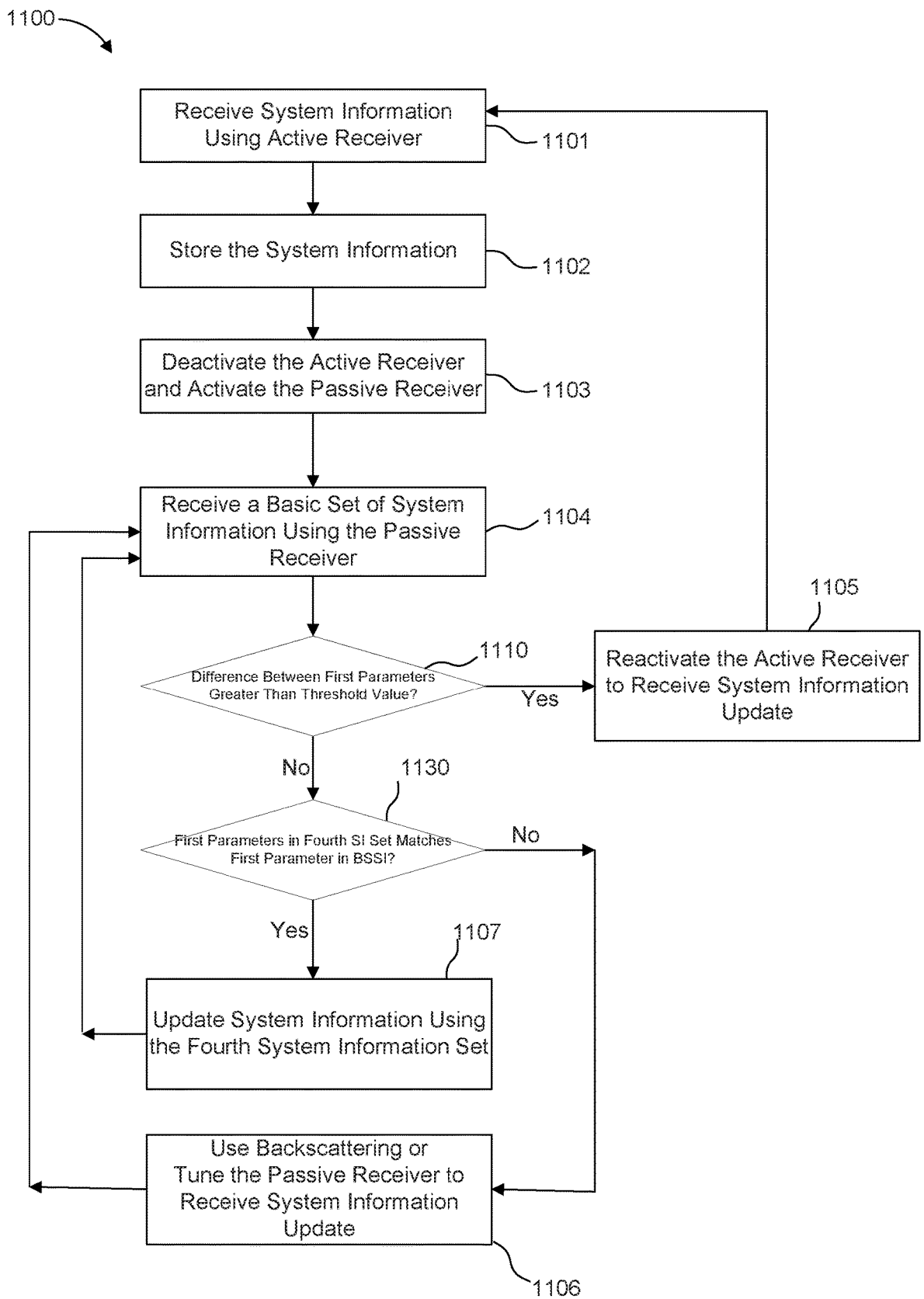
FIG. 11A is a diagram illustrating a method for updating system information according to an embodiment of this application.
Figure 11B:
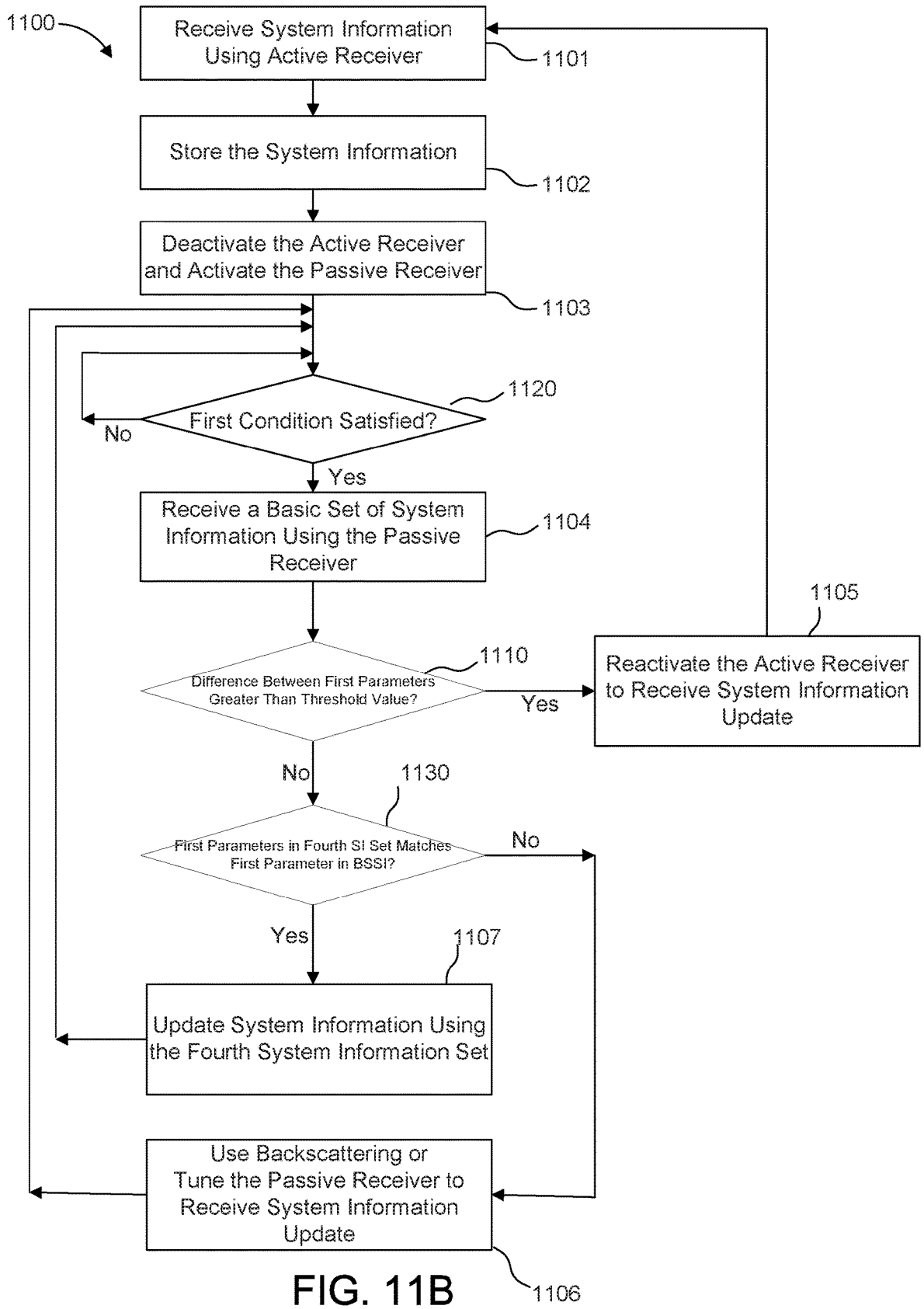
FIG. 11B is a diagram illustrating a method for updating system information according to an embodiment of this application.

A method 1100 for updating system information according to this application will be described below with reference to FIGS. 11A-11B. FIG. 11A is a flow chart illustrating the method 1100 for updating system information according to an embodiment of this application. FIG. 11B is a flow chart illustrating the method 1100 for updating system information according to another embodiment of this application.

It should be noted that those processes at 1101, 1102, 1103, 1104, 1105, 1106, 1110 and 1120 are the same as or similar to those corresponding processes shown in FIGS. 10A-10B. For example, the method 1100 may comprise: at 1105, reactivating the active receiver to receive a second system information set as a currently valid system information set for the WTRU.

The difference between the embodiments shown in FIGS. 11A-11B and the embodiments shown in FIGS. 10A-10B is that the embodiments shown in FIGS. 11A-11B may comprise those processes at 1130 and 1107. To be more specific, the embodiments shown in FIGS. 11A-11B focus on a scenario where the received system information comprises multiple system information sets. By comparison, the embodiments shown in FIGS. 10A-10B focus on a scenario where the received system information comprises one system information set (i.e., the first system information set as discussed above).The following part will describe this difference and these processes at 1130 and 1107 in detail.

In the embodiments shown in FIGS. 11A-11B, the system information received at 1101 may comprise multiple system information sets. For example, the system information may comprise a first system information set and a fourth system information set. The first system information set is the same as or similar to the first system information set discussed above with reference to FIG. 10A. The fourth system information set is an extra system information set in the system information. The fourth system information set may comprise same kinds of information elements as those in the first system information set. For example, in an embodiment, the fourth system information set may comprise: a first parameter comprising a system information set identifier, cell access evaluation criteria/parameters, cell reselection thresholds, etc. In another embodiment, the fourth information set may only comprise a subset of the information elements in the first system information set.

It should be noted that the above terms "first system information set", "fourth system information set" are used to differentiate different system information sets in the system information, and they are not intended to be limiting to the present application. Since the above embodiments already used the terms "second system information set" and "third system information", here using the term "fourth system information set" is trying to avoid confusion.

As shown in FIGS. 11A-11B, the method 1100 my further comprise: on a condition that the difference is not greater than the threshold value (at 1110), at 1130, determining whether a first parameter in the fourth system information set matches the first parameter in the BSSI, wherein on a condition that the first parameter in the fourth system information set matches the first parameter in the BSSI, at 1107, using a combination of information elements in the first system information set and information elements in the fourth system information set as the currently valid system information set. Accordingly, on a condition that the difference is not greater than the threshold value, the processor is further configured to determining whether a first parameter in the fourth system information set matches the first parameter in the BSSI, on a condition that the first parameter in the fourth system information set matches the first parameter in the BSSI, the processor is further configured to use a combination of information elements in the first system information set and information elements in the fourth system information set as the currently valid system information set. For example, the currently valid system information set may comprise cell reselection thresholds from the first system information set and a system information version identifier from the fourth system information set. It should be noted that the above example of the combination of information elements from the first system information set and the fourth system information is only given by way of example, and it is not intended to be exclusive. The WTRU may select other combinations of information elements from those two system information set as the currently valid system information set based on different scenarios.

In an embodiment, if the WTRU determines, at 1110, that the difference between the first parameter in the BSSI and the first parameter in the first system information set is not greater than the threshold value, it may mean that a desired system information update may be already stored in the system information received at 1101. In other words, the WTRU was just moving to a cell not very far from the previous severing cell, and thus, a desired system information set regarding this new cell may already be stored in the system information received at 1101. Therefore, the WTRU may want to search those multiple system information sets in the system information. If a particular system information set in the multiple system information sets is corresponding to the new cell, then that particular system information set may be used as the currently valid system information set for the WTRU, and thus there is no need to use either the active receiver or the passive receiver to receive a system information update.

The first parameter in the fourth system information set may comprise the same kinds of elements as those in the first system information set. For example, the first parameter in the fourth system information may comprise a system information version identifier. At 1130, the processor may calculate the difference between the system information version identifier in the BSSI and the system information version identifier in the fourth system information set. If the difference obtained is zero, then the processor may determine that the first parameter in the fourth system information set matches the first parameter in the BSSI. Then, the method 1100 may proceed to the process at 1107.

As discussed with reference to those embodiments shown in FIGS. 10A-10B, the first parameter may also comprise the ZE cell identifier. The ZE cell identifier may also be used for the determination at 1130. It will be appreciated that the process at 1130 may comprise determining both the system information version identifier and the ZE cell identifier. In other words, if the system information version identifiers from both the BSSI and the fourth system information set match with each other, and meanwhile, the ZE cell identifiers from both the BSSI and the fourth system information set match with each other, then the processor, at 1103, may determine that the first parameter in the fourth system information set matches the first parameter in the BSSI.

At 1107, the mehod 1100 further comprises: using the fourth system information set from the system information as the currently valid system information set for the WTRU. Accordingly, the system information is updated.

If at 1130, the WTRU determines that there is no match, then the method 1100 may proceed to the process at 1106, i.e., using backscattering to request the third system information set or tuning the passive receiver to receive the third system information set as the currently valid system information set for the WTRU.

A method for updating system information according to this application will be described as follows. This method is similar to the method 1100 discussed above. The difference between these two methods is a difference determination process in this method is different from that process at 1110. Here in this method, it comprises: determining whether each of differences between the first parameter in the BSSI and each first parameter in the multiple system information sets is greater than a threshold value. If each difference is greater than the threshold value, then this method may comprise: reactivating the active receiver to receive an update system information set as a currently valid system information set for the WTRU.

If one of the differences is not greater than the threshold value, this method may comprise: determining whether a second condition is satisfied by a second system information set in the plurality of system information sets. If the second condition is satisfied, then this method may proceed to a same process as that at 1107. If the second condition is not satisfied, then this method may proceed to a same process as that at 1106.

In an embodiment, the second condition may be that a first parameter in one of the multiple system information sets matches the first parameter in the BSSI. For example, similar to the discussion above with reference to FIG. 11A, if the first parameter in the fourth system information set matches the first parameter in the BSS, then the second condition is satisfied. It should be noted that the above second condition is only given by way of example, and it is not intended to be exclusive or be limiting to the present application.

Figure 12:
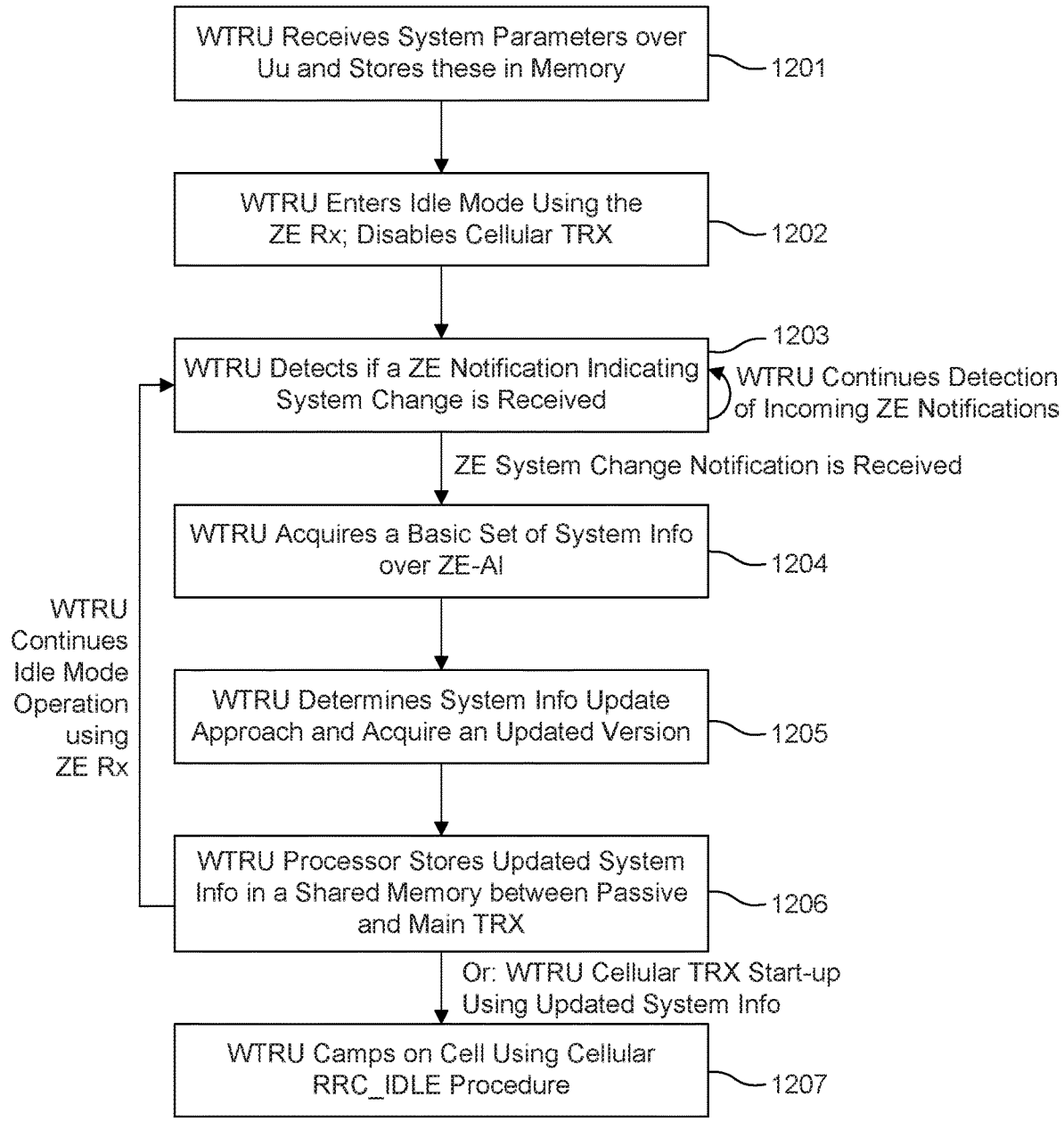
FIG. 12 is a diagram illustrating a method for updating system information according to another embodiment of this application.

An embodiment of the method for updating system information by a WTRU with a passive receiver and an active receiver will be described in detail as follows with reference to FIG. 12. FIG. 12 illustrates a method 1200 for updating system information according to another embodiment of this application.

The method 1200 may comprise: at 1201, receiving system parameters over Uu air interface, store the system parameters in a memory, and determine a sequence of energy accumulation events assuming a well-determined transmission format with known transmission characteristics; at 1202, entering idle mode using the ZE Rx and disabling cellular TRX; at 1203, detecting the presence of a system information change notification using a known energy profile or signature (e.g., detecting if a system information notification indicating system change is received); at 1204, acquiring, using the passive receiver, a basic set of system information (BSSI); at 1205, determining system information update approach (e.g., using the acquired BSSI to determine the presence/parameters (i.e. scheduling information and/or transmission characteristics) of a periodic transmission of incremental system information updates over the ZE air interface, and the validity of these incremental updates with respect to the stored version) and acquire an updated version of system information set; at 1206, storing the updated version of system information set in a shared memory between the active receiver and the passive receiver; and at 1207, camping the WTRU on a cell using cellular RRC_IDLE procedure based on the updated version of system information set.

Another embodiment of the method according to this application will be further described as follows. In this embodiment, first, the WTRU performing ZE cell reselection measurements may first trigger a cell reselection procedure. Second, the WTRU may select a new cell and acquire a new BSSI (e.g., a ZE mobility area identifier, a ZE cell identifier, a system information version identifier, etc.). Third, the WTRU may check if the received identifiers match those associated with any of the stored system information sets. Fourth, the WTRU may detect a match and consider the associated set of system information as a current version. Alternatively, the WTRU may detect a version identifier mismatch and mark the associated set of system information as invalid. Fifth, the WTRU may consider system information broadcast scheduling information detected in the BSSI. Alternatively, the WTRU may determine that an incremental system information update is not broadcast or does not correspond to the current stored base version. Sixth, the WTRU may receive an incremental system information update or alternatively request a system information broadcast using backscattering techniques. Seventh, the WTRU may store the new version of system information in a shared memory with the active receiver.

Another embodiment of the method according to this application will be further described as follows. In this embodiment, first, the WTRU equipped with a passive receiver may receive, using the Uu air interface, system information with neighboring cell parameters relevant to intra-frequency cell reselection over the ZE air interface, neighboring cell parameters relevant to inter-frequency/inter-RAT cell reselection over the Uu air interface, and mapping between ZE identifiers and Uu physical cell identifiers. Second, the WTRU may deactivate the active receiver and uses the passive receiver for idle mode operations/procedures, e.g. cell reselection procedure. Third, the WTRU may determine based on cell reselection criteria and/or network configurations that a switch from ZE idle mode to Uu idle mode is required. Fourth, the WTRU uses the mapping from ZE identifiers to Uu physical cell identifiers and loads the associated stored system information set or sets, that are still valid, to limit the Uu cell ID search space thereby reducing the processing complexity and speeding up cell camping process over the Uu air interface. Alternatively, the WTRU may receive system information and mapping between short-length cell identifiers and unique physical cell identifiers over a Uu air interface before switching to the ZE air interface.

Another embodiment of the method according to this application will be further described as follows. In this embodiment, first, the WTRU may receive combined system information sets for one or more ZE cells within one or more ZE-mobility areas when active over the Uu air interface. Second, the WTRU may store the received system information sets in a memory or buffer that is shared between the active receiver and the passive receiver. Third, the WTRU may detect a change in the serving cell and initiate a cell re-selection procedure, receive a system information change notification, or receive a public warning system notification over the ZE air interface. Fourth, the WTRU may trigger a WTRU acquisition procedure of a BSSI over the ZE air interface which is used to determine the parameters required to update the stored system information sets. Fifth, the WTRU may tune its passive reception circuitry based on the BSSI to receive incremental updates of the stored system information over the ZE air interface. Alternatively or additionally, the WTRU may reactivate its active receiver to receive new combined system information sets over the Uu air interface. Alternatively, the WTRU may utilize backscattering parameters received in the BSSI to request specific system information transmission over the ZE air interface. Alternatively, a WTRU may receive a BSSI to validate current stored version of a system information set or sets. Alternatively, a WTRU may utilize short-length cell identifiers for idle mode operations over the ZE air interface and receive incremental system information updates over the ZE air interface. Alternatively, the WTRU may utilize mapping between the ZE short-length cell identifiers and unique physical cell identifiers to limit cell ID search space when switching to Uu air interface.

The technical advantage of re-using the ZE mobility area identifiers over sufficiently spatially separated areas, the temporary ZE cell identifiers over different areas, and system information version identifiers over time may be to reduce the signaling overhead over the ZE air interface using the passive receiver.

Figure 13:
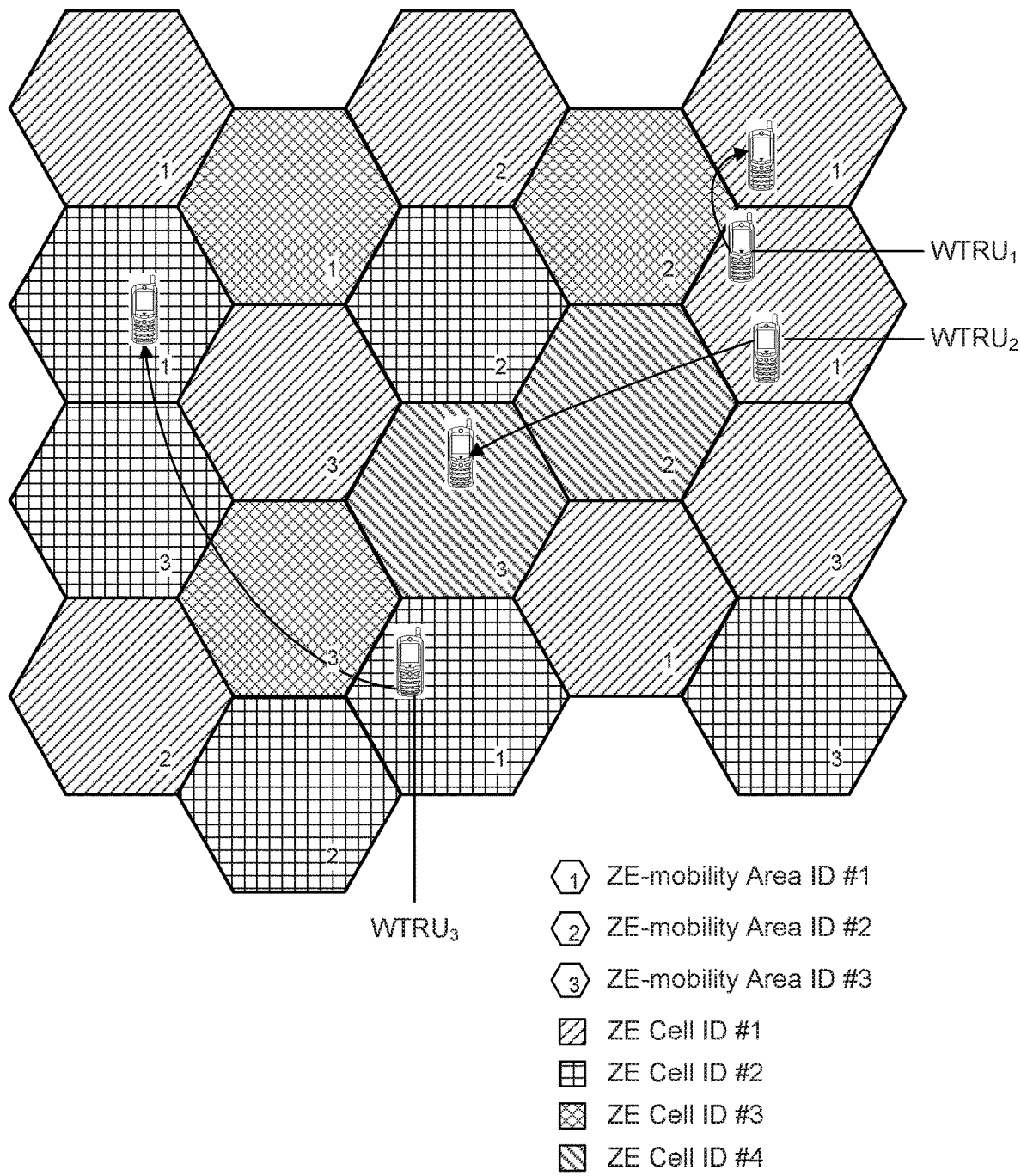
FIG. 13 is a diagram illustrating an example distribution of area identifiers and cell association with example mobility scenarios.

Another embodiment of the method according to this application will be further described as follows with reference to FIG. 13. FIG. 13 illustrates an example distribution of area identifiers and cell association with example mobility scenarios. FIG. 13 is an illustrative example of the distribution of the ZE mobility area identifiers and the association of ZE cells for each area along with three different WTRU mobility scenarios used to describe different technical realizations of the WTRU system information acquisition procedure utilizing the passive receiver. As illustrated in FIG. 13, three ZE mobility area identifiers are used or reused where each area comprises of at most four different ZE cells and therefore a maximum of four temporary ZE cell identifiers are considered. The temporary ZE cell identifiers do not have to be uniquely assigned to cells within a ZE-mobility area (i.e. ZE cells in a ZE-mobility area that have the same system information parameters are assigned the same temporary ZE cell identifier.)

In a first embodiment shown in FIG. 13, first, a WTRU (i.e., $UE_1$ in FIG. 13) may receive system information sets corresponding to cells in two different ZE-mobility areas with area IDs #1 and #2 over the Uu air interface using common or dedicated control signaling. Second, the WTRU may determine that it has sufficient memory to store all the received system information sets. Third, when the WTRU moves from ZE cell #1 in area #1 to ZE cell #3 in area #2, the WTRU may initiate a cell re-selection procedure and re-acquire the basic set of system information from ZE cell #3 in area #2 over the ZE air interface. Fourth, using the ZE-mobility area identifier, temporary ZE cell identifier, and version identifier received as part of the basic set of system information, the WTRU may check to make sure that they match the identifiers associated with any of the stored system information sets and updates the memory address pointer to the location of the matched system information set (i.e. system information set associated with ZE cell #3 in area #2 in this illustrating scenario). Fifth, the WTRU may utilize the newly loaded system information set for IDLE state operations/procedures (e.g. cell re-selection procedure). When the WTRU moves back to ZE cell #1 in area #1, it may repeat the same procedure to update the shared memory address pointer to the location of the corresponding system information set.

In a second embodiment shown in FIG. 13, a WTRU (i.e., $UE_2$ in FIG. 13) may receive system information sets corresponding to cells in two different ZE-mobility areas with area IDs #1 and #2 over the Uu air interface using common or dedicated control signaling. The WTRU may then determine that the WTRU has sufficient shared memory to store a subset of the received system information and it decides to store system information sets associated with cell #1 in area #1 and cell #4 in area #2 where the decision might be based on random selection or historical data with or without the serving cell/network assistance. The WTRU may then repeat the third step to the fifth step from the above first embodiment shown in FIG. 13 when it moves from cell #1 in area #1 to cell #4 in area #2 to activate the system information associated with the newly selected cell. As the WTRU continue moving from cell #4 in area #2 to cell #4 in area #3, the WTRU may repeat the third step and the fourth step from the above first embodiment, but during the process at the step 4, the WTRU may determine that the received area identifier does not match any of the stored ones. The WTRU may also determine that the required system information for the current serving cell is not periodically broadcast over the ZE air interface and that backscattering-based system information request is not supported, therefore it reactivates the active receiver to receive the desired system information update. The WTRU may receive combined system information for all the ZE cells in area #3, but the WTRU may decide to store the system information set associated with cell #4 in area #3 by overwriting the system information set associated with area #1 (i.e. the oldest detected area identifier).

In a third embodiment shown in FIG. 13, a WTRU (i.e., $UE_3$ in FIG. 13) may receive system information sets corresponding to cells in two different ZE-mobility areas with area IDs #1 and #3 over the Uu air interface using common or dedicated control signaling. The WTRU may then determine that the WTRU has sufficient shared memory to store a subset of the received system information and it decides to store system information sets associated with ZE cells #1-#2 in area #1 and ZE cells #1-#3 in area #3 where the decision might be based on random selection or historical data with or without the serving cell/network assistance. The WTRU may then repeat the third step to the fifth step from the above first embodiment shown in FIG. 13 when the WTRU moves from cell #2 in area #1 to cell #3 in area #3 (and when it moves from cell #3 in area #3 to cell #2 in area #3) to activate the system information set associated with the newly selected cell. As the WTRU continue moving from cell #2 in area #3 to cell #2 in area #1, the WTRU may repeat the third step and the fourth step from the above first embodiment shown in FIG. 13, but during the process at the step 4, the WTRU may determine that the received area identifier matches one that belongs to an invalid stored system information set where the invalidity might be determined using any of the following options:

First, a time limit where system information associated with a specific ZE-mobility area ID may become invalid after a time period $T_v$ past the first cell reselection in an area with a different ZE-mobility area ID. The time limit may take into account the expected WTRU mobility and the distance between two areas assigned the same ZE-mobility area ID.

Second, cell transition tracking using cell (re-)selection parameters may be included in stored system information regarding neighboring cells. For example, determining that stored system information for area #1 identifies cells #3 and #4 as neighboring cell and detecting a transition from cell #2 in area #3 to cell #2 in area #1 may flag the latest detect area ID #1 as different than the stored one.

Third, utilization of the unique physical cell IDs, if available, which might be transmitted with lower periodicity than the basic set of system information to optimize radio resource utilization.

Fourth, utilization of location/positioning information with or without network assistance, if available. For example, $UE_3$ declares system information associated with area ID #1 as invalid if the position associated with the newly detected area ID is at a distance D from a stored position associated with a previously detected area ID #1 that is greater than a preconfigured threshold value.

The WTRU may also determine that the required system information set for the current serving cell is not periodically broadcast over the ZE air interface and that backscattering-based system information request is not supported, therefore it reactivates the active receiver to receive the desired system information update.

In a fourth embodiment shown in FIG. 13, first, a WTRU ($UE_1$ in FIG. 13) may receive system information sets corresponding to cells in two different ZE-mobility areas with area IDs #1 and #2 over the Uu air interface using common or dedicated control signaling. Second, the WTRU may determine that it has sufficient memory to store all the received system information. The WTRU may then repeat the third step to the fifth step from the above first embodiment shown in FIG. 13 when it moves from cell #1 in area #1 to cell #3 in area #2 to activate the system information associated with the newly selected cell. As the WTRU continue moving from cell #3 in area #2 to cell #1 in area #1, the WTRU may repeat the third step and the fourth step from the above first embodiment shown in FIG. 13, but during the process at the step 4, the WTRU may determine that the received version identifier does not match the stored one with a single version difference. The WTRU may also determine that the system information update in system information with respect to the stored version is being periodically broadcast over the ZE air interface. The WTRU may tune its passive receiver circuitry based on scheduling information received in the BSSI or that is preconfigured at the WTRU to receive the system information changes corresponding to either a single or multiple cells in area #1 (in the illustrating example there is only a single configuration for all the cells in the area, however, the system information changes may result in different configurations for each cell).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for updating system information by a Wireless Transmit/Receive Unit (WTRU), comprising:
    receiving, using an active receiver, system information comprising a first system information set, wherein the first system information set is currently valid for the WTRU;
    deactivating the active receiver and activating a passive receiver;
    receiving a basic set of system information (BSSI) using the passive receiver; and
    reactivating the active receiver to receive a second system information to be set as a currently valid system information set for the WTRU based on a comparison of a threshold value with a difference between a parameter in the BSSI and a parameter in the first system information set.

2. The method of claim 1, wherein on a condition that the difference is not greater than the threshold value, using backscattering to request a third system information set or tuning the passive receiver to receive the third system information set as the currently valid system information set for the WTRU.

3. The method of claim 1, wherein the system information further comprises a fourth system information set, and on a condition that the difference is not greater than the threshold value, determining whether a first parameter in the fourth system information set matches the first parameter in the BSSI,
    on a condition that the first parameter in the fourth system information set matches the first parameter in the BSSI, using a combination of information elements in the first system information set and information elements in the fourth system information set as the currently valid system information set.

4. The method of claim 3, wherein on a condition that the first parameter in the fourth system information set does not match the first parameter in the BSSI, using backscattering to request a fifth system information set or tuning the passive receiver to receive the fifth system information set as the currently valid system information set for the WTRU.

5. The method of claim 1, wherein before receiving the basic set of system information (BSSI) using the passive receiver, the method further comprises: determining whether a first condition is satisfied, wherein
on a condition that the first condition is satisfied, the method further comprises receiving the basic set of system information (BSSI) using the passive receiver.

6. The method of claim 1, wherein the parameter in the BSSI comprises a system information version identifier.

7. The method of claim 6, wherein the parameter in the BSSI further comprises at least one of a ZE cell identifier or a ZE mobility area identifier.

8. A method for updating system information by a Wireless Transmit/Receive Unit (WTRU), comprising:
receiving, using an active receiver, system information comprising a plurality of system information sets, wherein a first system information set in the plurality of system information sets is currently valid for the WTRU, and each of the plurality of system information sets comprises a first parameter;
deactivating the active receiver and activating a passive receiver;
receiving a basic set of system information (BSSI) using the passive receiver; and
reactivating the active receiver to receive a second system information to be set as a currently valid system information set for the WTRU based on a comparison of a threshold value with a difference between a parameter in the BSSI and a parameter in the first system information set.

9. The method of claim 8, wherein before the receiving a basic set of system information (BSSI) using the passive receiver, the method further comprises: determining whether a first condition is satisfied, wherein on a condition that the first condition is satisfied, the method further comprises receiving the basic set of system information (BSSI) using the passive receiver.

10. The method of claim 8, wherein on a condition that one of the differences is not greater than the threshold value, determining whether a second condition is satisfied by a second system information set in the plurality of system information sets, wherein
on a condition that the second condition is satisfied, using the second system information set as the currently valid system information set for the WTRU; and
on a condition that the second condition is not satisfied, using backscattering to request the update system information set or tuning the passive receiver to receive the update system information set as the currently valid system information set for the WTRU.

11. The method of claim 10, wherein the second condition is a first parameter in one of the plurality of system information sets matches the first parameter in the BSSI.

12. A Wireless Transmit/Receive Unit (WTRU) for updating system information, comprising:
an active receiver configured to receive system information comprising a first system information set, wherein the first system information set is currently valid for the WTRU;
a passive receiver configured to receive a basic set of system information (BSSI);
a processor configured to deactivate the active receiver and activate the passive receiver after the active receiver receives the system information, and reactivate the active receiver to receive a second system information to be set as a currently valid system information set for the WTRU, based on a comparison of a threshold value with a difference between a parameter in the BSSI and a parameter in the first system information set.

13. The WTRU of claim 12, wherein on a condition that the difference is not greater than the threshold value, the processor is further configured to use backscattering to request a third system information set or tune the passive receiver to receive the third system information set as the currently valid system information set for the WTRU.

14. The WTRU of claim 12, wherein the system information further comprises a fourth system information set, and on a condition that the difference is not greater than the threshold value, the processor is further configured to determining whether a first parameter in the fourth system information set matches the first parameter in the BSSI,
on a condition that the first parameter in the fourth system information set matches the first parameter in the BSSI, the processor is further configured to use a combination of information elements in the first system information set and information elements in the fourth system information set as the currently valid system information set.

15. The WTRU of claim 14, wherein on a condition that the first parameter in the fourth system information set does not match the first parameter in the BSSI, the processor is further configured to use backscattering to request a fifth system information set or tune the passive receiver to receive the fifth system information set as the currently valid system information set for the WTRU.

16. The WTRU of claim 12, wherein the processor is further configured to determine whether a first condition is satisfied before the passive receiver receives the basic set of system information (BSSI), wherein
on a condition that the first condition is satisfied, the passive receiver receives the basic set of system information (BSSI).

17. The WTRU of claim 12, wherein the parameter in the BSSI comprises a system information version identifier.

18. The WTRU of claim 17, wherein the parameter in the BSSI further comprises at least one of a ZE cell identifier or a ZE mobility area identifier.

19. The WTRU of claim 16, wherein the first condition is that the passive receiver receives a system information change notification or a public warning notification.

20. The WTRU of claim 16, wherein the first condition is that the WTRU detects a change in a serving cell or initiates a cell reselection procedure.

* * * * *